United States Patent
Kaiga et al.

(10) Patent No.: US 7,778,160 B2
(45) Date of Patent: Aug. 17, 2010

(54) DEVICE FOR SYNCHRONIZING BETWEEN AN ACTIVE UNIT AND A STANDBY UNIT

(75) Inventors: Takashi Kaiga, Kawasaki (JP); Koichi Sugama, Kawasaki (JP); Tsutomu Chikazawa, Kawasaki (JP); Yukio Katayanagi, Kawasaki (JP); Kenichi Yajima, Kawasaki (JP); Hideo Abe, Kawasaki (JP); Ryuji Kayama, Kawasaki (JP); Masahiro Shioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 11/780,099

(22) Filed: Jul. 19, 2007

(65) Prior Publication Data

US 2008/0037592 A1   Feb. 14, 2008

(30) Foreign Application Priority Data

Aug. 11, 2006   (JP) ............................. 2006-219584

(51) Int. Cl.
    *G01R 31/08* (2006.01)
(52) U.S. Cl. .................. 370/218; 370/220; 370/503
(58) Field of Classification Search ......... 370/217–220, 370/518, 503, 519; 375/373–376, 357

See application file for complete search history.

(56) References Cited

U.S. PATENT DOCUMENTS

| 6,356,550 | B1 * | 3/2002 | Williams ..................... 370/364 |
| 6,404,247 | B1 * | 6/2002 | Wang .......................... 327/158 |
| 6,418,144 | B1 * | 7/2002 | Saeki ......................... 370/395.6 |
| 6,856,626 | B2 * | 2/2005 | Desai ......................... 370/395.32 |
| 2003/0053494 | A1 * | 3/2003 | Mochizuki ................. 370/539 |
| 2007/0189155 | A1 | 8/2007 | Shioda et al. |

FOREIGN PATENT DOCUMENTS

| JP | 11-134209 A | 5/1999 |
| JP | 2007-221259 | 8/2007 |

* cited by examiner

*Primary Examiner*—Ian N Moore
(74) *Attorney, Agent, or Firm*—Katten Muchin Rosenman LLP

(57) ABSTRACT

A transmission device in which a bus of a central processing unit is used to synchronize timing signals between units, thereby restraining enlargement in scale of wiring. A reference signal generator generates a reference signal. A reference signal receiver is mounted on a unit set as an active or standby unit and receives the reference signal. A timing signal generator divides the frequency of the received reference signal by means of a frequency divider/counter to generate a timing signal. A count holder holds the count value of the frequency divider/counter. The bus connects the units and the central processing unit. A count receiver receives, via the bus, the count value from the count holder of the active unit. A count updater updates the count value of the frequency divider/counter to the count value received by the count receiver.

7 Claims, 17 Drawing Sheets

| N | PROBABILITY |
|---|---|
| 3 | 0.512000 |
| 4 | 0.819200 |
| 5 | 0.942080 |
| 6 | 0.983040 |
| 7 | 0.995328 |
| 8 | 0.998769 |
| 9 | 0.999686 |
| 10 | 0.999922 |
| 11 | 0.999981 |
| 12 | 0.999995 |

FIG. 13

| M | PROBABILITY |
|---|---|
| 1 | 0.6 |
| 2 | 0.072 |
| 3 | 0.00864 |
| 4 | 0.0010368 |
| 5 | 0.0001244 |
| 6 | 1.493E-05 |
| 7 | 1.792E-06 |
| 8 | 2.15E-07 |
| 9 | 2.58E-08 |
| 10 | 3.096E-09 |

FIG. 14

DEVICE FOR SYNCHRONIZING BETWEEN AN ACTIVE UNIT AND A STANDBY UNIT

CROSS-REFERENCE TO RELATED APPLICATIONS

This application is based upon and claims the benefits of priority from the prior Japanese Patent Application No. 2006-219584 filed on Aug. 11, 2006, the entire contents of which are incorporated herein by reference.

BACKGROUND OF THE INVENTION

1. Field of the Invention

The present invention relates to transmission devices, and more particularly, to a transmission device provided in a synchronous communication network to transmit signals.

2. Description of the Related Art

As a result of the recent demand for massive transmission of information, signals have come to be transmitted in larger volumes and at higher speeds. For subscriber-side interfaces in particular, those using Ethernet (registered trademark)—based technology have been developed, besides conventional DS1/DS3 techniques. Also, more and more diverse services are being incorporated in SONET (Synchronous Optical Network)/SDH (Synchronous Digital Hierarchy) networks as backbone networks.

MSPP (Multi Service Provisioning Platform) has been devised in order that diverse services may be taken care of by a single platform. To efficiently provision the individual services, each card (unit) is provided with the necessary SONET/SDH STS/AU POH (Path Overhead byte) termination/generation function (PTE (Path Termination Equipment) function).

Meanwhile, semiconductor scaling techniques have also advanced, enabling a single unit to process a larger volume of signals. Accordingly, line error that occurs at the time of switching to a standby unit during the maintenance exerts an influence to a greater extent.

To avoid such an inconvenience, there has been an increasing demand for systems capable of switching units without entailing a momentary interruption.

FIG. 17 illustrates wirings of a conventional transmission device for transferring a frame timing signal and a multi-frame signal. The figure shows external interface PIUs (Plug-In Units) 101 to 104, STS cross-connect PIUs 105 and 106, VT cross-connect PIUs 107 and 108, a bus 109, and a CPU 110. Also, in the figure, W101 to W104 denote wirings for transferring an 8-kHz frame timing signal, and W105 to W107, indicated by dashed lines, denote wirings for transferring a 2-kHz multi-frame signal. W108 denotes wiring via which the STS cross-connect PIUs 105 and 106 synchronize their 8-kHz frame timing signals with each other.

Further, in FIG. 17, (W) and (P) signify Work and Protect, respectively. The illustrated transmission device is configured for SONET; in the case of SDH, each STS cross-connect PIU is replaced by an AU cross-connect PIU and each VT cross-connect PIU is replaced by a TU cross-connect PIU. In the following, explanation is directed to SONET but applies also to SDH.

The external interface PIUs 101 to 104 are interfaces for exchanging signals with external devices. The STS cross-connect PIUs 105 and 106 are each a PIU with STS-level cross-connect function, and the VT cross-connect PIUs 107 and 108 are each a PIU capable of VT pointer processing and having VT cross-connect function.

The external interface PIUs 101 to 104, the STS cross-connect PIUs 105 and 106 and the VT cross-connect PIUs 107 and 108 constitute a redundant configuration and are each set as an active (ACT) or standby (STBY) PIU. Active and standby PIUs carry out identical signal processing, and the signal from the active PIU is selected at the input of the next-stage PIU.

Let us suppose, for example, that the STS cross-connect PIU 105 and the VT cross-connect PIU 107 are active PIUs and that the STS cross-connect PIU 106 and the VT cross-connect PIU 108 are standby PIUs. In this case, the VT cross-connect PIUs 107 and 108 select the signal from the STS cross-connect PIU 105, and the STS cross-connect PIUs 105 and 106 select the signal from the VT cross-connect PIU 107. The external interface PIUs 101 to 104 select the signal from the STS cross-connect PIU 105.

In the transmission device, an 8-kHz frame timing signal is generated to synchronize frames within the device so that at the time of switching between the active and standby PIUs, the switching may be effected without causing a momentary interruption.

In the case of the transmission device shown in FIG. 17, the STS cross-connect PIUs 105 and 106 are each provided with a circuit for generating an 8-kHz frame timing signal, which is supplied via the wirings W101 to W104 to the respective PIUs. Also, the STS cross-connect PIUs 105 and 106 synchronize their 8-kHz frame timing signals with each other via the wiring W108.

Thus, even in the case where the STS cross-connect PIU is switched from the standby PIU 106 to the active PIU 105, for example, the switching can be effected without entailing a momentary interruption, because frame synchronization is achieved through the wiring W108. Also, since the VT cross-connect PIUs 107 and 108 are supplied with the same 8-kHz frame timing signal through the wiring W103 or W104, frames are synchronized, whereby switching between these two PIUs can be carried out without causing a momentary interruption.

The VT cross-connect PIUs 107 and 108 use, however, a 2-kHz multi-frame signal for VT pointer processing. Specifically, the VT cross-connect PIUs 107 and 108 individually divide the frequency of the 8-kHz frame timing signal to generate a 2-kHz multi-frame signal independently of each other. Thus, the multi-frame signals generated by the respective VT cross-connect PIUs 107 and 108 can become desynchronized with a probability of 3/4. If the active/standby switching is executed while synchroneity is lost, the primary signal suffers error.

To achieve synchroneity between the multi-frame signals of the VT cross-connect PIUs 107 and 108, the STS cross-connect PIU 105, 106 may divide the frequency of the 8-kHz frame timing signal and distribute the generated 2-kHz multi-frame signal to the VT cross-connect PIUs 107 and 108. For example, the 2-kHz multi-frame signal is distributed via the wiring W105 or W106 to the individual VT cross-connect PIUs 107 and 108.

Alternatively, the VT cross-connect PIUs 107 and 108 may exchange signal generation timings with each other to synchronize the multi-frame signals. For example, the multi-frame signal generation timings are exchanged via the wiring W107 to achieve synchroneity between the multi-frame signals.

The multi-frame signals of the VT cross-connect PIUs 107 and 108 are synchronized in the aforementioned manner, to prevent unwanted error from occurring at the time of active/standby switching.

All PIUs in the transmission device, including the STS cross-connect PIUs 105 and 106 and the VT cross-connect PIUs 107 and 108, are connected to the CPU (Central Processing Unit) 110 via the bus 109 for the purpose of various settings by firmware as will as other control actions. In FIG. 17, the connections of the bus 109 with the external interface PIUs 101 to 104 and the STS cross-connect PIUs 105 and 106 are not illustrated.

Meanwhile, there has been proposed a fault tolerant controller which includes a main system control part and a slave system control part and in which, in case of abnormality of the main system control part, the slave system control part is started to succeed the control mode of the main system control part based on the count value of a slave system counter, thereby to control the control object (see, e.g., Unexamined Japanese Patent Publication No. H11-134209).

In the conventional transmission device, however, exclusive wiring (in FIG. 17, the wirings W105 to W107) is needed to synchronize the timing signals (multi-frame signals) obtained by dividing the frequency of the reference signal (frame timing signal), giving rise to the problem that the wiring is correspondingly complicated and enlarged in scale.

SUMMARY OF THE INVENTION

The present invention was created in view of the above circumstances, and an object thereof is to provide a transmission device which uses a bus of a central processing unit to synchronize timing signals generated by respective units, thereby restraining enlargement in scale of wiring.

To achieve the object, there is provided a transmission device which is provided in a synchronous communication network to transmit signals. The transmission device comprises a reference signal generator for generating a reference signal, a reference signal receiver mounted on a unit which is set as an active or standby unit, for receiving the reference signal, a timing signal generator mounted on the unit, for dividing a frequency of the received reference signal by means of a frequency divider/counter to generate a timing signal, a count holder mounted on the unit, for holding a count value of the frequency divider/counter, a bus connecting the unit and a central processing unit, a count receiver mounted on the unit, for receiving, via the bus, the count value from the count holder of the active unit, and a count updater mounted on the unit, for updating the count value of the frequency divider/counter to the count value received by the count receiver.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 shows the probability that an identical difference value is repeated three times.

FIG. 14 shows the probability that the count value of a standby (STBY) PIU is updated when the number of repetitions is set to M with the frame timing signals desynchronized.

DESCRIPTION OF THE PREFERRED EMBODIMENTS

The principles of the present invention will be described in detail below with reference to the accompanying drawings.

Figure 1:
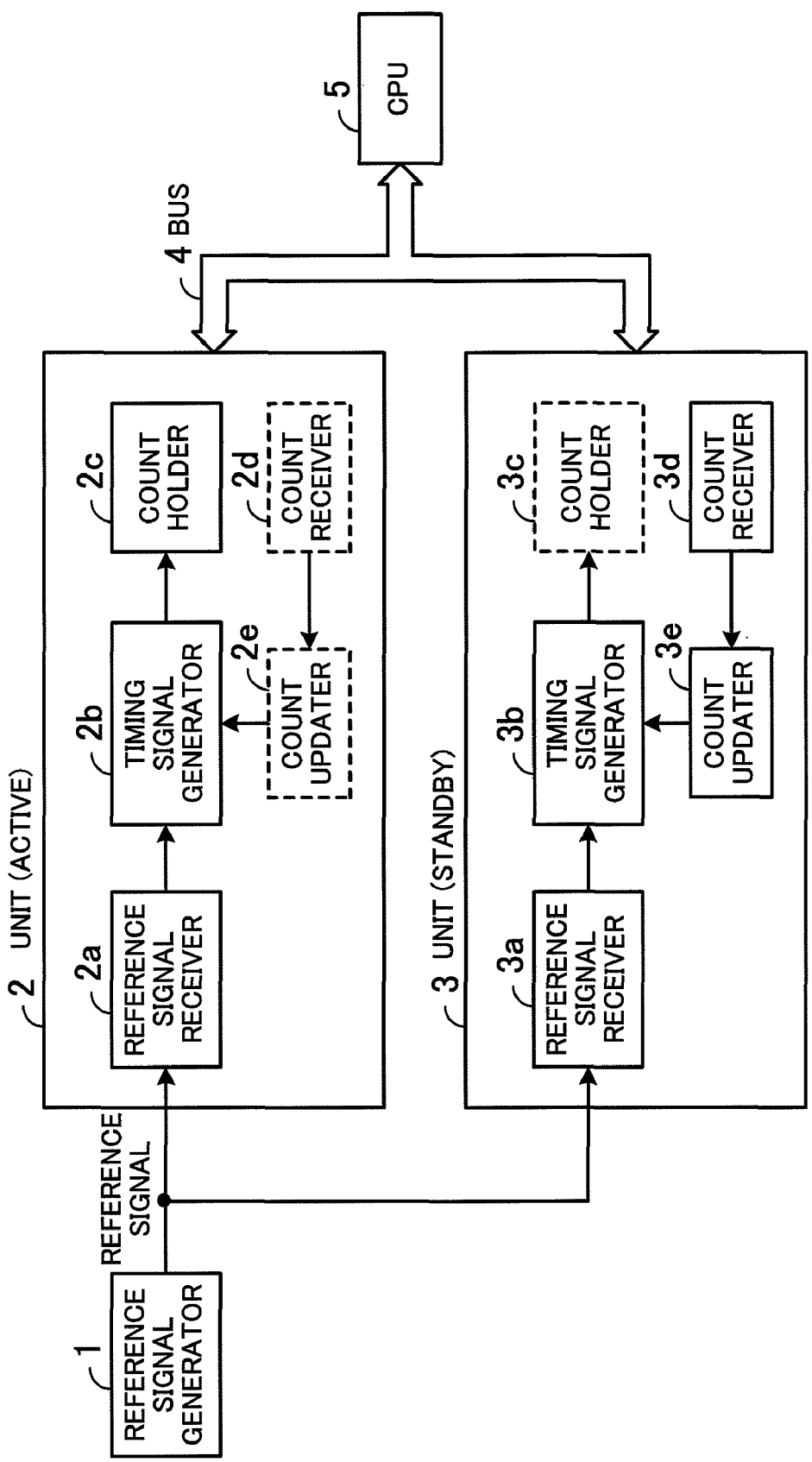
FIG. 1 schematically illustrates a transmission device.

FIG. 1 schematically illustrates a transmission device. As illustrated, the transmission device has a reference signal generator 1, units 2 and 3, a bus 4, and a central processing unit 5. The unit 2 includes a reference signal receiver $2a$, a timing signal generator $2b$, a count holder $2c$, a count receiver $2d$, and a count updater $2e$. The unit 3 includes elements identical with those of the unit 2, namely, a reference signal receiver $3a$, a timing signal generator $3b$, a count holder $3c$, a count receiver $3d$, and a count updater $3e$.

The reference signal generator 1 generates a reference signal for synchronizing frames within the transmission device. The reference signal is supplied to the units 2 and 3 as well as to other units, not shown, in the transmission device.

The reference signal receiver $2a$, $3a$ receives the reference signal from the reference signal generator 1.

The timing signal generator $2b$, $3b$ is provided with a frequency divider/counter and divides the frequency of the received reference signal to generate a timing signal.

For example, the frequency divider/counter recurrently counts up as 0, 1, 2, 3, 0, 1, 2, ... each time a pulse of the reference signal is received. When the frequency divider/counter counts up to "3", for example, the timing signal generator $2b$ outputs a pulse signal, whereby a timing signal obtained by dividing the frequency of the reference signal by "4" can be generated.

The units 2 and 3 are set as active and standby units or vice versa. The units 2 and 3 are supplied with the same reference signal from the reference signal generator 1 and therefore, can synchronize frames with each other. This permits the active/standby switching to be carried out without entailing a momentary interruption. Also, the units 2 and 3 each perform signal pointer processing, for example, by using the timing signal obtained by dividing the frequency of the reference signal. The units 2 and 3 synchronize their timing signals via the bus 4, to thereby permit the active-to-standby switching to be effected without a momentary interruption.

Where the units are active and standby units each with VT cross-connect function, for example, the two units are supplied with an identical 8-kHz frame timing signal (reference signal). Also, to perform VT pointer processing, the units individually divide the frequency of the 8-kHz frame timing signal by "4" to generate a 2-kHz multi-frame signal (timing signal) independently of each other. The active and standby units each with VT cross-connect function synchronize their generated timing signals with each other via the bus 4 so that the active-to-standby switching can be carried out without a momentary interruption.

The count holder 2c, 3c holds (indicates) the count value of the frequency divider/counter of the timing signal generator 2b, 3b. In the above instance, the count holder 2c, 3c holds the count value which is recurrently counted up as 0, 1, 2, 3, 0, 1, . . . by the frequency divider/counter.

The units 2 and 3 are connected with the bus 4 to be controlled by the central processing unit 5. The count receiver 2d, 3d of the standby unit 2, 3 periodically receives, via the bus 4, the count value of the frequency divider/counter from the count holder 2c, 3c of the active unit 2, 3. For example, where the units 2 and 3 are set as active and standby units, respectively, the count receiver 3d periodically receives the count value of the frequency divider/counter of the timing signal generator 2b from the count holder 2c of the active unit via the bus 4.

The count updater 2e, 3e updates the count value of the frequency divider/counter, provided in the timing signal generator 2b, 3b, to the count value received by the count receiver 2d, 3d. In the above instance, the count receiver 3d of the standby unit 3 receives the count value from the count holder 2c of the active unit 2, and the count updater 3e updates the count value of the frequency divider/counter in the timing signal generator 3b to the received count value.

The units 2 and 3 have identical elements as illustrated. However, where the unit is set as an active unit, the reference signal receiver, the timing signal generator and the count holder are activated. On the other hand, where the unit is set as a standby unit, the reference signal receiver, the timing signal generator, the count receiver and the count updater are activated.

The operation of the transmission device shown in FIG. 1 will be now described. In the following, it is assumed that the units 2 and 3 are set as active and standby units, respectively. Accordingly, in the unit 2, the count receiver 2d and the count updater 2e are deactivated (as indicated by the dashed rectangles). In the unit 3, the count holder 3c is deactivated (as indicated by the dashed rectangle).

The reference signal receivers 2a and 3a each receive the reference signal from the reference signal generator 1. Each of the timing signal generators 2b and 3b divides the frequency of the received reference signal by means of the frequency divider/counter, to generate a timing signal.

The count holder 2c of the active unit holds the count value of the frequency divider/counter in the timing signal generator 2b.

The count receiver 3d of the standby unit receives, at regular intervals via the bus 4, the count value held by the count holder 2c of the active unit. The count updater 3e updates the count value of the frequency divider/counter in the timing signal generator 3b to the count value received by the count receiver 3d. Consequently, the count values of the frequency divider/counters in the timing signal generators 2b and 3b of the active and standby units coincide with each other, whereby the timing signals are synchronized with each other.

In this manner, the count receiver 3d of the standby unit receives the count value of the frequency divider/counter of the active unit via the bus 4 connected to the central processing unit 5. It is therefore unnecessary to provide exclusive wiring for synchronizing the timing signals, making it possible to restrain enlargement in scale of wiring.

A first embodiment of the present invention will be now described in detail with reference to the drawings.

Figure 2:
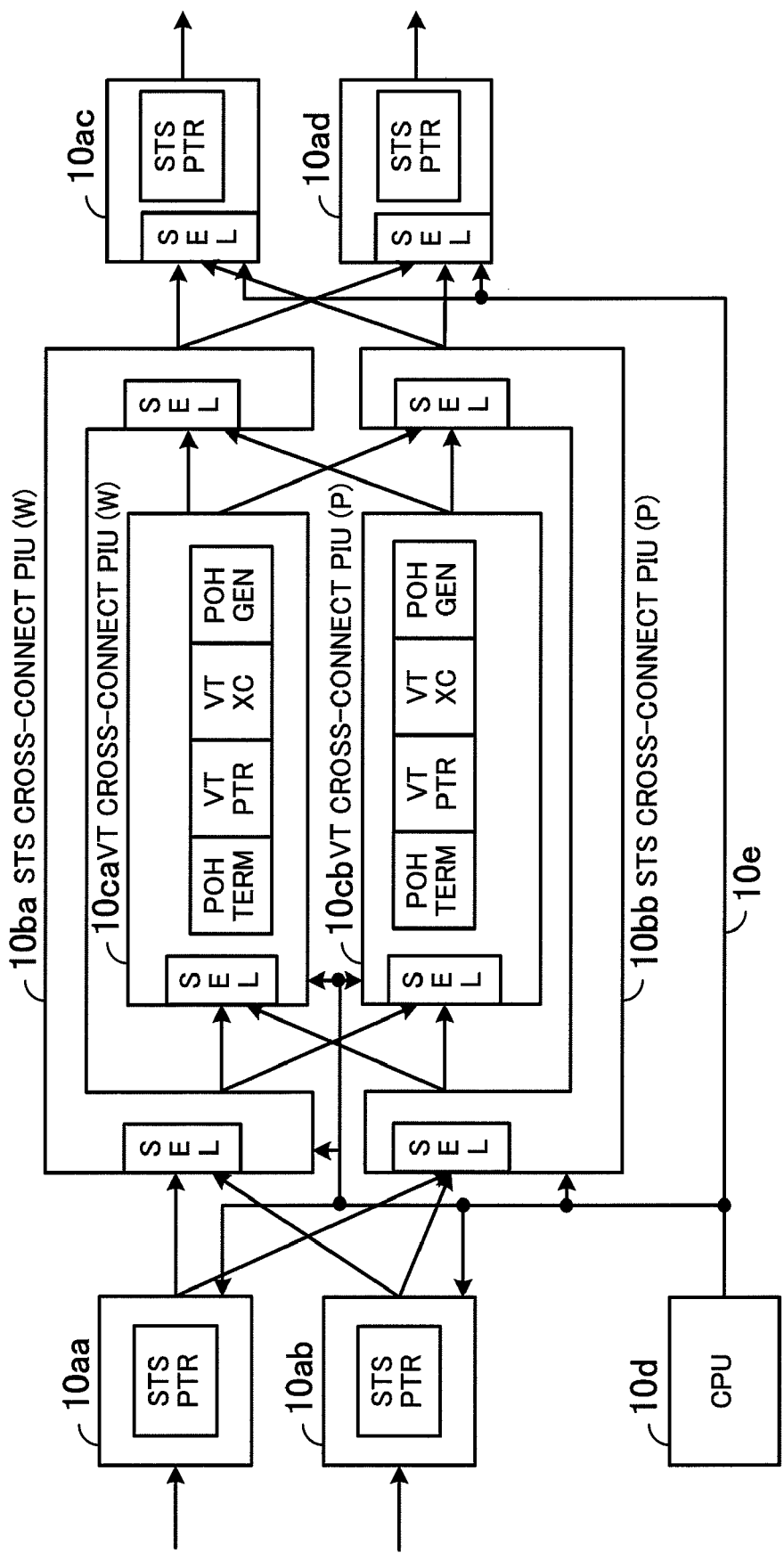
FIG. 2 is a block diagram of a transmission device according to a first embodiment.

FIG. 2 is a block diagram of a transmission device according to the first embodiment. As illustrated, the transmission device includes external interface PIUs 10aa to 10ad, STS cross-connect PIUs 10ba and 10bb, VT cross-connect PIUs 10ca and 10cb, a CPU 10d, and a bus 10e. In the figure, (W) stands for Work and (P) stands for Protect. The illustrated transmission device is configured for SONET, by way of example. In the case of SDH, each STS cross-connect PIU is replaced by an AU cross-connect PIU and each VT cross-connect PIU by a TU cross-connect PIU.

The external interface PIUs 10aa to 10ad are interfaces for exchanging signals with external devices. External signals are, for example, OC48 optical signals, DS1/DS3 signals, or Ethernet signals.

The STS cross-connect PIUs 10ba and 10bb are each a PIU with STS-level cross-connect function. The VT cross-connect PIUs 10ca and 10cb are each a PIU capable of VT pointer processing and having VT cross-connect function.

The external interface PIUs 10aa to 10ad, the STS cross-connect PIUs 10ba and 10bb and the VT cross-connect PIUs 10ca and 10cb constitute a redundant configuration and are individually set as active or standby PIUs. The signal from the active PIU is selected in the next-stage PIU.

Let us suppose, for example, that the STS cross-connect PIU 10ba and the VT cross-connect PIU 10ca are set as active PIUs and that the STS cross-connect PIU 10bb and the VT cross-connect PIU 10cb are set as standby PIUs. In this case, both the STS cross-connect PIUs 10ba and 10bb process signals output from the external interface PIUs 10aa and 10ab, and output the processed signals to the VT cross-connect PIUs 10ca and 10cb. The VT cross-connect PIUs 10ca and 10cb both select the signal output from the STS cross-connect PIU 10ba, process the selected signal, and output the processed signal to the STS cross-connect PIUs 10ba and 10bb. The STS cross-connect PIUs 10ba and 10bb select the signal output from the VT cross-connect PIU 10ca, process the selected signal, and output the processed signal to the external interface PIUs 10ac and 10ad. The external interface PIUs 10ac and 10ad select the signal output from the STS cross-connect PIU 10ba.

In FIG. 2, SEL represents a selector for selecting an input signal. For example, where the VT cross-connect PIU 10ca is set as an active PIU, the SEL on the right-hand side of the STS cross-connect PIU 10ba selects the signal from the VT cross-connect PIU 10ca.

The external interface PIUs 10aa and 10ab each reframe the input signal in accordance with an 8-kHz frame timing signal supplied from the active STS cross-connect PIU (10ba or 10bb). In conformity with the reframing, each STS PTR reallocates an STS pointer. This allows the phases of channels to be aligned at the STS level with respect to the 8-kHz frame timing signal.

Each of the STS cross-connect PIUs 10ba and 10bb cross-connects, at the STS level, the signal output from the active-side external interface PIU 10aa, 10ab, and outputs, to the VT cross-connect PIUs 10ca and 10cb, a signal that needs to be cross-connected at the VT level.

A POH terminator in the VT cross-connect PIU 10ca, 10cb terminates POH at the STS level and also performs alarm detection and error counting at the STS level. Further, the POH terminator reallocates the STS pointer to a fixed value (e.g., 522).

A VT PTR reallocates a VT pointer in accordance with the reallocated value of the STS pointer. This allows the phases of channels to be aligned at the VT level in each STS with respect to the 8-kHz frame timing signal.

A VT XC cross-connects signals at the VT level. The VT XC is also capable of cross-connection across STS.

A POH generator inserts an STS-level POH, as well as the STS pointer (fixed value; in the above instance, 522), into the output signal The external interface PIUs 10ac and 10ad select the signal output from the active STS cross-connect PIU (10ba or 10bb), then reframe the signal at 8-kHz timing, and output the resulting signal to the external devices. The STS PTR reallocates the STS pointer according to the reframing.

The CPU 10d is connected with the individual PIUs via the bus 10e. The CPU 10d controls each of the PIUs. Also, the CPU 10d carries out active/standby setting of the individual PIUs and controls the respective SELs accordingly, whereby each succeeding-stage PIU can select the signal output from the active PIU of the preceding stage.

The wirings of the transmission device for transferring the frame timing signal and the multi-frame signal will be now described with reference to FIG. 3. The figure shows external interface PIUs 11 to 14, STS cross-connect PIUs 15 and 16, VT cross-connect PIUs 17 and 18, a bus 19, and a CPU 20. The external interface PIUs 11 to 14 respectively correspond to the external interface PIUs 10aa to 10ad shown in FIG. 2. Also, the STS cross-connect PIUs 15 and 16 respectively correspond to the STS cross-connect PIUs 10ba and 10bb, and the VT cross-connect PIUs 17 and 18 respectively correspond to the VT cross-connect PIUs 10ca and 10cb. The bus 19 and the CPU 20 respectively correspond to the bus 10e and the CPU 10d.

Figure 3:
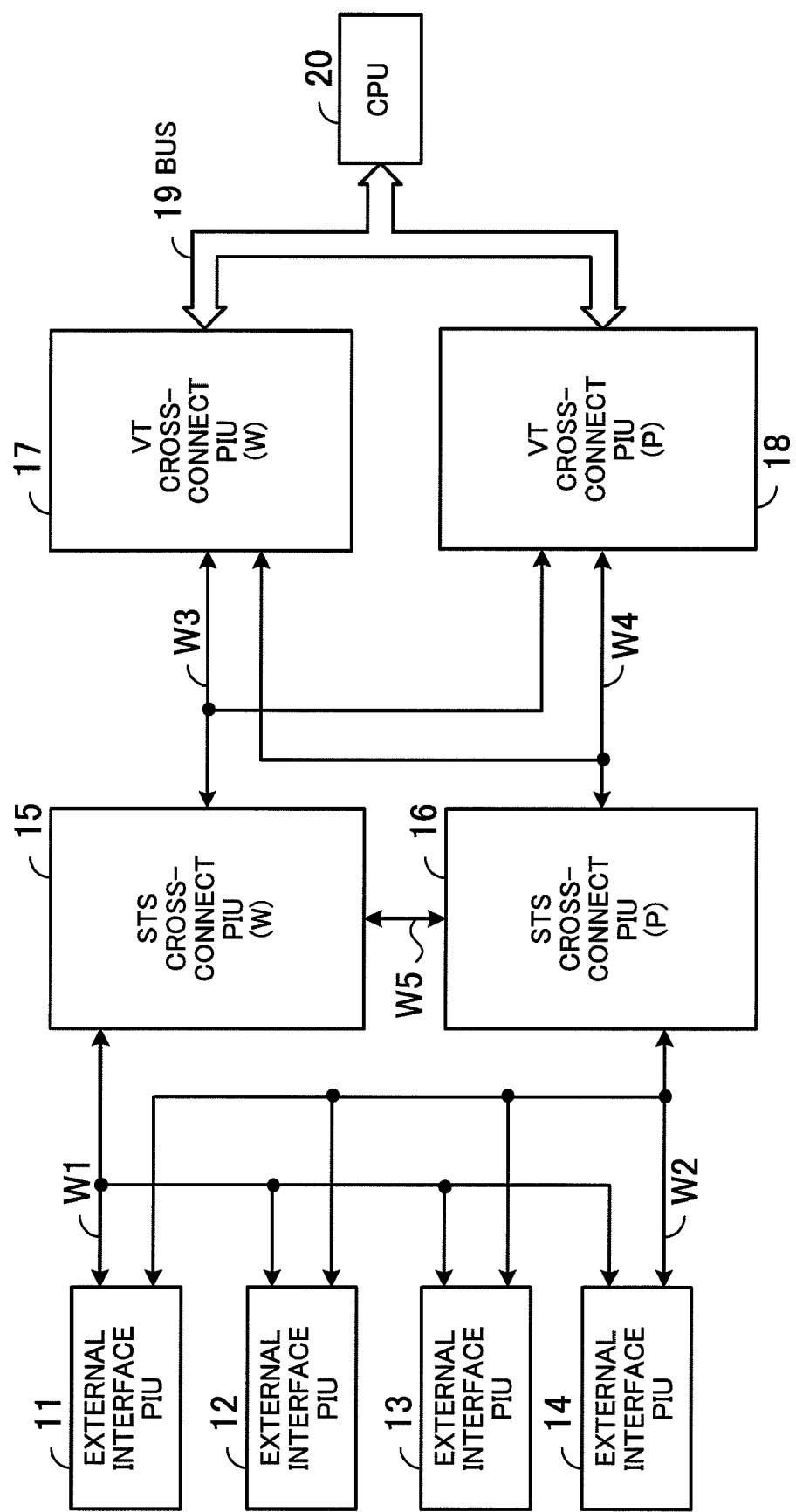
FIG. 3 shows wirings of the transmission device for transferring a frame timing signal and a multi-frame signal.

Also, in FIG. 3, W1 to W4 indicate wirings for transferring an 8-kHz frame timing signal, and W5 indicates wiring through which the STS cross-connect PIUs 15 and 16 synchronize their 8-kHz frame timing signals with each other.

The 8-kHz frame timing signal is generated in the transmission device to synchronize frames within the device so that at the time of switching between active and standby PIUs each with STS-level cross-connect function, the switching may be executed without entailing a momentary interruption.

In the case of the illustrated transmission device, the STS cross-connect PIUs 15 and 16 are each provided with a circuit for generating an 8-kHz frame timing signal, which is supplied via the wirings W1 to W4 to the respective PIUs. Also, the STS cross-connect PIUs 15 and 16 synchronize their 8-kHz frame timing signals with each other via the wiring W5.

The CPU 20 is connected with all PIUs in the transmission device via the bus 19. In FIG. 3, the connections of the bus 19 with the external interface PIUs 11 to 14 and the STS cross-connect PIUs 15 and 16 are not illustrated.

The VT cross-connect PIUs 17 and 18 each use a 2-kHz multi-frame signal for VT pointer processing. Each of the VT cross-connect PIUs 17 and 18 generates the 2-kHz multi-frame signal by dividing the frequency of the 8-kHz frame timing signal supplied thereto.

Also, the VT cross-connect PIUs 17 and 18 synchronize their multi-frame signals with each other via the bus 19. Thus, when active/standby switching is executed during maintenance, for example, error attributable to asynchronism of the multi-frame signals does not occur and the switching can be effected without a momentary interruption.

In this manner, the VT cross-connect PIUs 17 and 18 achieve synchroneity of their multi-frame signals by using the bus 19 connected to the individual PIUs. It is therefore unnecessary to provide extra wiring for synchronizing the multi-frame signals, thereby restraining enlargement in scale of wiring.

The VT cross-connect PIUs 17 and 18 shown in FIG. 3 will be now described in detail.

Figure 4:
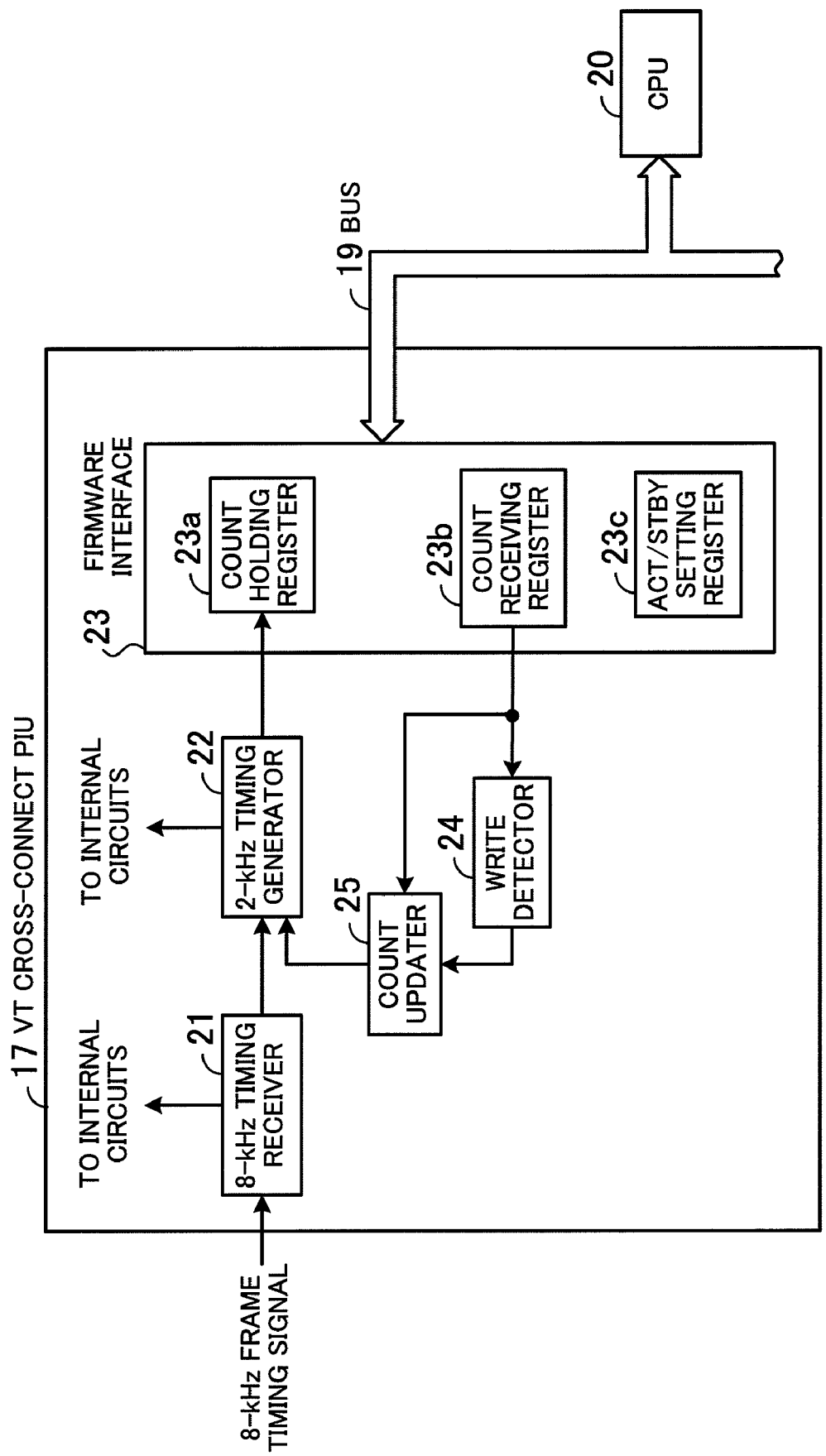
FIG. 4 is a block diagram showing details of a VT cross-connect PIU.

FIG. 4 is a block diagram showing details of the VT cross-connect PIU. The figure shows, in addition to the VT cross-connect PIU 17, the bus 19 and the CPU 20 appearing in FIG. 3.

The VT cross-connect PIU 17 includes an 8-kHz timing receiver 21, a 2-kHz timing generator 22, a firmware interface 23, a write detector 24, and a count updater 25. The VT cross-connect PIU 18 shown in FIG. 3 also has the same functional blocks as those shown in FIG. 4, and description thereof is omitted.

The 8-kHz timing receiver 21 receives the 8-kHz frame timing signal from the STS cross-connect PIU 15 or 16 which is set as an active PIU, and supplies the received frame timing signal to internal circuits requiring the frame timing signal.

The 2-kHz timing generator 22 divides the frequency of the frame timing signal received from the 8-kHz timing receiver 21 by "4", to generate a 2-kHz multi-frame signal. The 2-kHz timing generator 22 is provided with a divide-by-four frequency divider/counter for counting pulses of the frame timing signal, for example, and generates the multi-frame signal based on the count value of the divide-by-four frequency divider/counter. Thus, where the divide-by-four frequency divider/counter is configured to recurrently counts up as 0, 1, 2, 3, 0, 1, . . . each time a pulse of the 8-kHz frame timing signal is received, a signal may be output when the count value reaches "3", for example, whereby a 2-kHz multi-frame signal can be obtained. The 2-kHz timing generator 22 supplies the generated multi-frame signal to internal circuits requiring the multi-frame signal.

The firmware interface 23 includes a count holding register 23a, a count receiving register 23b, and an ACT/STBY (active/standby) setting register 23c. The firmware interface 23 exchanges data with the CPU 20 via the bus 19.

The count holding register 23a holds the count value of the divide-by-four frequency divider/counter provided in the 2-kHz timing generator 22. In the case of the aforementioned divide-by-four frequency divider/counter, the count holding register 23a holds the count value which is recurrently counted up as 0, 1, 2, 3, 0, 1, . . . by the divide-by-four frequency divider/counter.

The count receiving register 23b receives, via the bus 19, the value of the count holding register provided in the other VT cross-connect PIU operating as an active PIU. Namely, the count receiving register 23b performs its function when the VT cross-connect PIU 17 is a standby PIU.

Let us suppose, for example, that the VT cross-connect PIUs 18 and 17 are active and standby PIUs, respectively. In this case, the count receiving register 23b of the VT cross-connect PIU 17 receives, via the bus 19, the value of the count holding register of the VT cross-connect PIU 18. On the other hand, where the VT cross-connect PIU 17 is an active PIU and the VT cross-connect PIU 18 is a standby PIU, the count receiving register of the VT cross-connect PIU 18 receives, via the bus 19, the value of the count holding register 23a of the VT cross-connect PIU 17.

The ACT/STBY setting register 23c, which holds an active/standby setting set by the CPU 20, activates and deactivates corresponding functional elements. When the setting "active" is made, for example, the ACT/STBY setting register 23c activates the 8-kHz timing receiver 21, the 2-kHz timing generator 22, and the count holding register 23a. On the other hand, when the setting "standby" is made, the ACT/STBY setting register 23c activates the 8-kHz timing receiver 21, the 2-kHz timing generator 22, the count receiving register 23b, the write detector 24, and the count updater 25. By activating and deactivating the individual functional elements in this manner, it is possible to reduce power consumption.

The write detector 24 detects reception of the count value by the count receiving register 23b and notifies the count updater 25 of the reception. Namely, when the count receiving register 23b is supplied with the count value of the divide-by-four frequency divider/counter from the active VT cross-connect PIU, the write detector 24 notifies the count updater 25 that the count value has been received.

When the reception of the count value is detected by the write detector 24, the count updater 25 writes the count value received by the count receiving register 23b over the count value of the divide-by-four frequency divider/counter in the 2-kHz timing generator 22. Thus, where the VT cross-connect PIU 17 is a standby PIU, the count value of the divide-by-four frequency divider/counter in the 2-kHz timing generator 22 can be made to coincide with the count value of the active VT cross-connect PIU 18, whereby the multi-frame signals can be synchronized.

When the VT cross-connect PIU 17 is set as an active PIU, the CPU 20 periodically acquires the count value of the count holding register 23a via the bus 19. The CPU 20 then writes the acquired count value in the count receiving register of the VT cross-connect PIU 18 which is set as a standby PIU. The CPU 20 executes the process in accordance with firmware stored in memory, for example.

The following describes the operation of the transmission device wherein the VT cross-connect PIUs 17 and 18 in FIG. 3 are set as active and standby PIUs, respectively.

Figure 5:
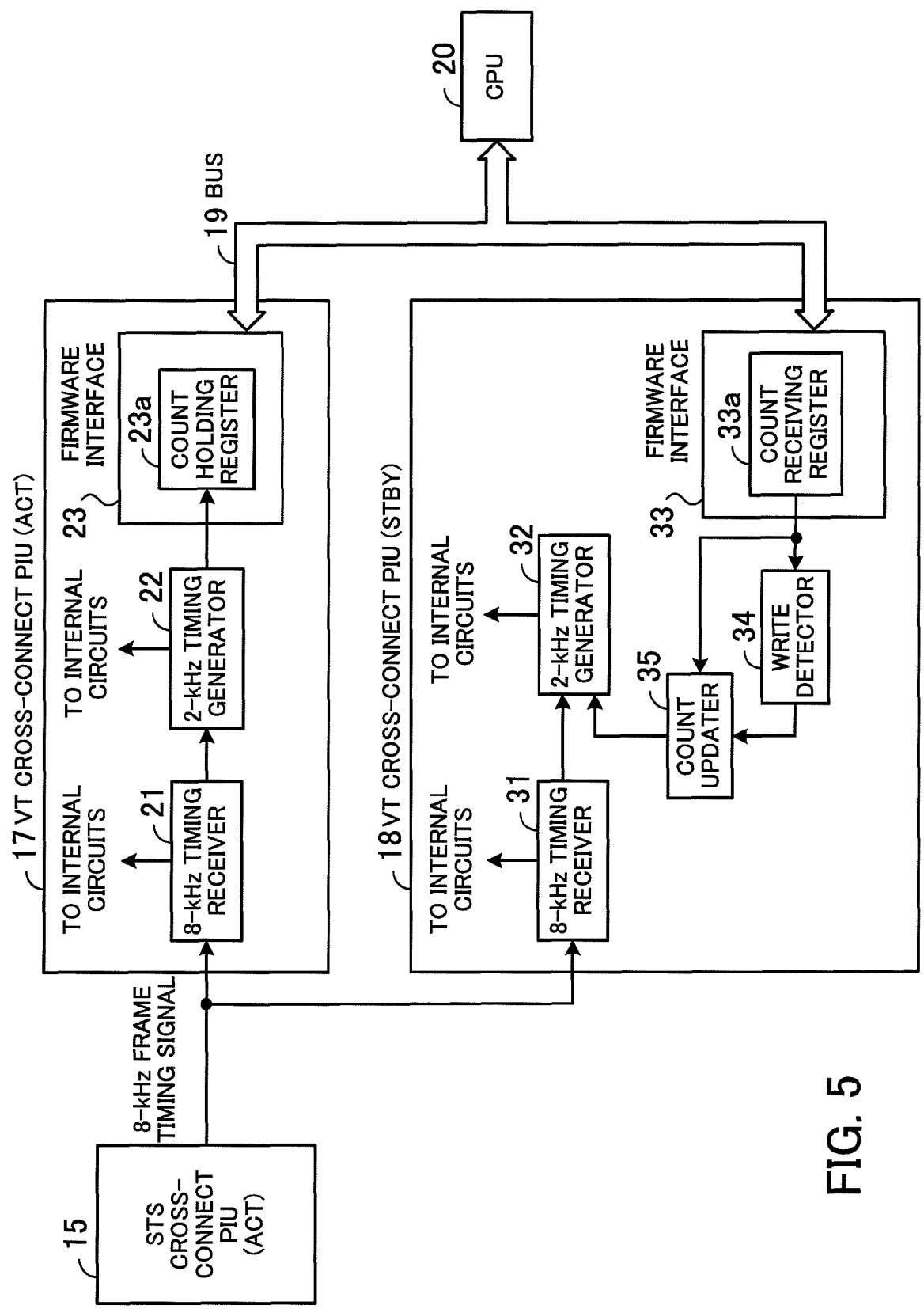
FIG. 5 is a block diagram illustrating the operation of the VT cross-connect PIUs.

FIG. 5 is a block diagram illustrating the operation of the VT cross-connect PIUs. The figure shows the STS cross-connect PIU 15, the VT cross-connect PIUs 17 and 18, the bus 19, and the CPU 20.

The VT cross-connect PIU 17 is set as an active (ACT) PIU as illustrated, and accordingly, the 8-kHz timing receiver 21, the 2-kHz timing generator 22 and the count holding register 23a are activated by the ACT/STBY setting register 23c (not shown in FIG. 5). The VT cross-connect PIU 17 actually has all the functional elements shown in FIG. 4. In FIG. 5, however, only the activated elements, namely, the 8-kHz timing receiver 21, the 2-kHz timing generator 22 and the count holding register 23a are shown and the other functional elements are not illustrated.

On the other hand, the VT cross-connect PIU 18 is set as a standby (STBY) PIU, and accordingly, the 8-kHz timing receiver 31, the 2-kHz timing generator 32, the count receiving register 33a, the write detector 34 and the count updater 35 are activated by the ACT/STBY setting register. The VT cross-connect PIU 18 actually has all of the functional elements shown in FIG. 4. In FIG. 5, however, only the activated elements, namely, the 8-kHz timing receiver 31, the 2-kHz timing generator 32, the count receiving register 33a, the write detector 34 and the count updater 35 are shown and the other functional elements are not illustrated.

The 8-kHz timing receiver 21 of the active VT cross-connect PIU 17 receives the 8-kHz frame timing signal from the STS cross-connect PIU 15.

The 2-kHz timing generator 22 divides the frequency of the frame timing signal received from the 8-kHz timing receiver 21 by "4", to generate a 2-kHz multi-frame signal.

Also, the 8-kHz timing receiver 31 of the standby VT cross-connect PIU 18 receives the 8-kHz frame timing signal in order that the active/standby switching may be effected without a momentary interruption. The 2-kHz timing generator 32 divides the frequency of the frame timing signal by "4" to generate a 2-kHz multi-frame signal.

The count holding register 23a of the VT cross-connect PIU 17 holds the count value of the divide-by-four frequency divider/counter provided in the 2-kHz timing generator 22. Consequently, the count holding register 23a holds the count value which is recurrently counted up as 0, 1, 2, 3, 0, 1, . . . , for example, at 8 kHz.

The CPU 20 periodically acquires the count value of the count holding register 23a via the bus 19. Then, the CPU 20 writes, via the bus 19, the acquired count value in the count receiving register 33a of the standby VT cross-connect PIU 18.

On detecting the writing of the count value in the count receiving register 33a, the write detector 34 notifies the count updater 35 that the count value has been received.

When supplied with the notification from the write detector 34, the count updater 35 updates the count value of the divide-by-four frequency divider/counter in the 2-kHz timing generator 32 to the count value received by the count receiving register 33a. Consequently, the count values of the divide-by-four frequency divider/counters in the 2-kHz timing generators 22 and 32 of the active and standby PIUs coincide with each other.

The following describes the manner of how the count values of the divide-by-four frequency divider/counters are synchronized.

Figure 6:
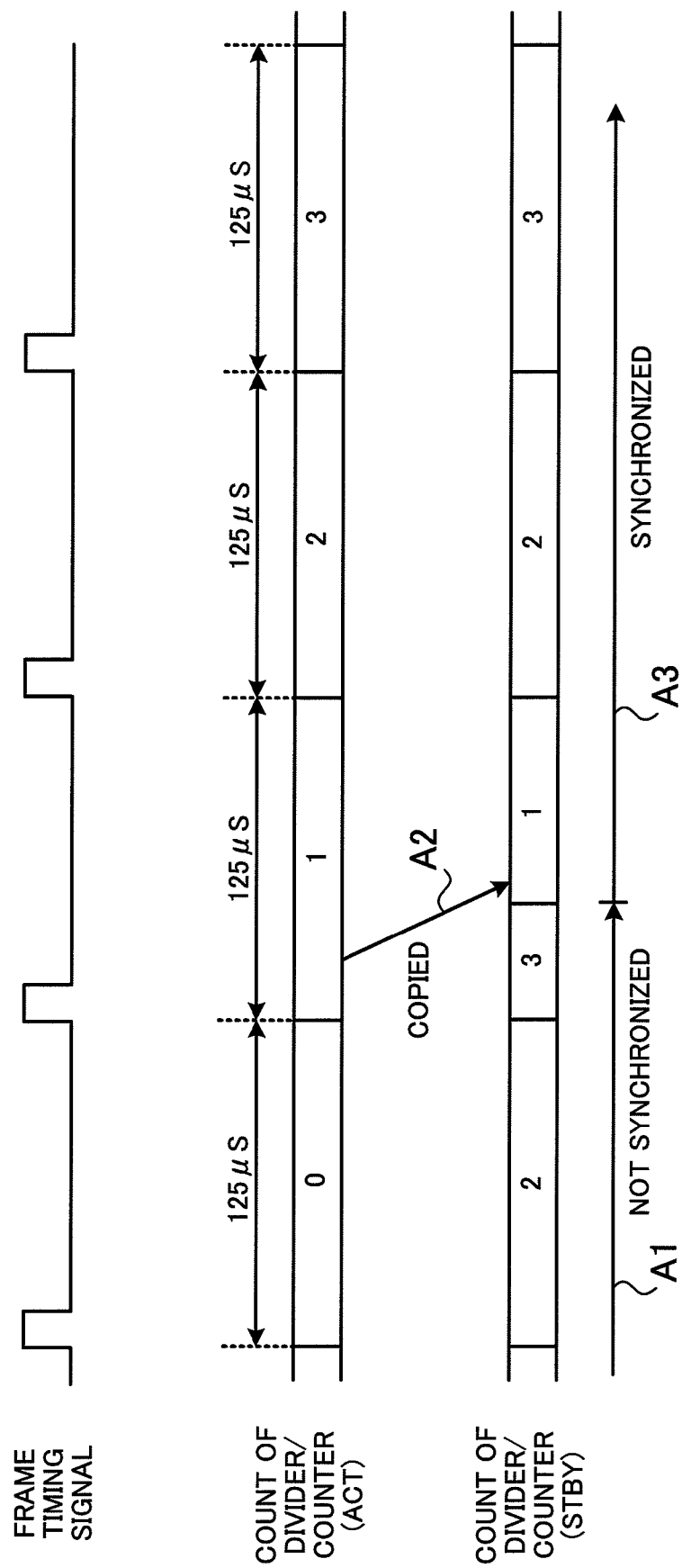
FIG. 6 shows the count values of divide-by-four frequency divider/counters.

FIG. 6 shows the count values of the divide-by-four frequency divider/counters. In the figure, the 8-kHz frame timing signal and the count values of the divide-by-four frequency divider/counters in the 2-kHz timing generators 22 and 32 of the active and standby PIUs are illustrated.

As shown in FIG. 6, each of the divide-by-four frequency divider/counters of the active and standby PIUs recurrently counts up as 0, 1, 2, 3, 0, 1, . . . in synchronism with the 8-kHz frame timing signal. Let us suppose here that the count values of the divide-by-four frequency divider/counters of the active and standby PIUs are not synchronized, as indicated by arrow A1.

The CPU 20 periodically sends the count value of the divide-by-four frequency divider/counter of the active PIU to the standby PIU. The divide-by-four frequency divider/counter of the standby PIU copies the count value sent from the active PIU, thereby synchronizing its count value with that of the divide-by-four frequency divider/counter of the active PIU.

Suppose, for example, that the count value of the active PIU is copied to the standby PIU at timing indicated by arrow A2. In this case, after the copying, the count values of the divide-by-four frequency divider/counters of the active and standby PIUs are synchronized with each other, as indicated by arrow A3.

In this manner, the VT cross-connect PIUs 17 and 18 synchronize their multi-frame signals with each other by making use of the bus 19 connected thereto. This makes it unnecessary to provide extra wiring for synchronizing the multi-frame signals, thus restraining enlargement in scale of wiring.

In the foregoing, the STS cross-connect PIU 15, 16 and the VT cross-connect PIU 17, 18 are explained as separate PIUs, but the present invention is also applicable to the case where the STS cross-connect PIU 15, 16 has VT cross-connect function and VT pointer processing function. Namely, the STS cross-connect PIU 15, 16 may have the function of the VT cross-connect PIU 17, 18 explained above.

A second embodiment of the present invention will be now described in detail with reference to the drawings. In the first embodiment, the count values of the divide-by-four frequency divider/counters of the active and standby PIUs may possibly fail to synchronize with each other depending on the timing of copying the count value of the divide-by-four frequency divider/counter. According to the second embodiment, the count values of the divide-by-four frequency divider/counters of the active and standby PIUs can be synchronized with each other regardless of the count copying timing.

Figure 7:
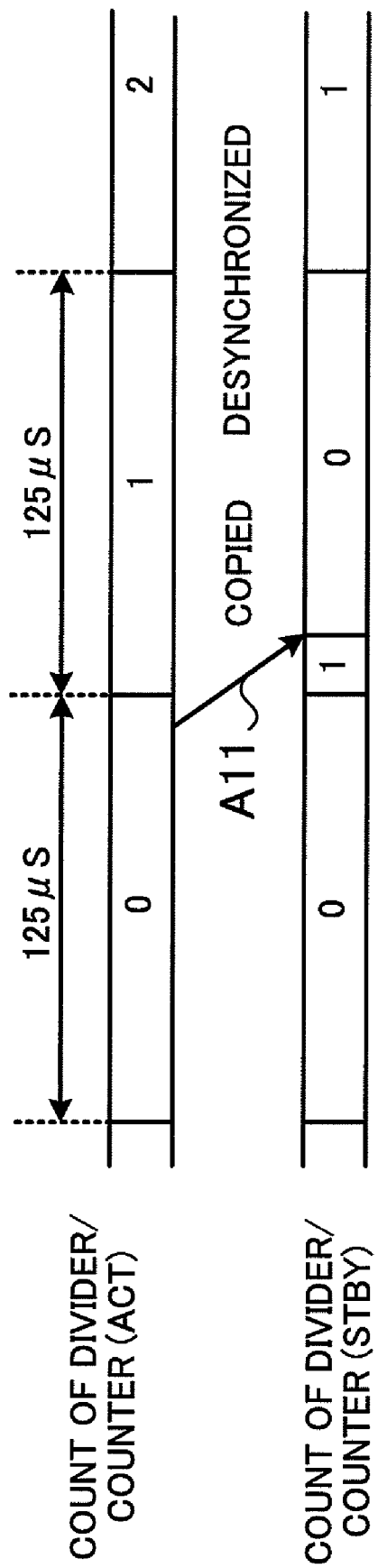
FIG. 7 shows an exemplary case where the count values become desynchronized.

FIG. 7 illustrates an exemplary case where the count values become desynchronized. The figure shows the count values of the divide-by-four frequency divider/counters in the 2-kHz timing generators of the active and standby PIUs.

Let us suppose that the count value of the active PIU is copied to the standby PIU at timing indicated by arrow A11. In this case, the count values of the active and standby PIUs become desynchronized from each other. Namely, a certain period of time is required to copy the count value, and if this copying time overlaps with the count-up timing, the count value of the standby PIU becomes desynchronized from that of the active PIU.

In the second embodiment, therefore, when the count copying time overlaps with the count-up timing, the count value of the active PIU is not copied to the standby PIU.

Figure 8:
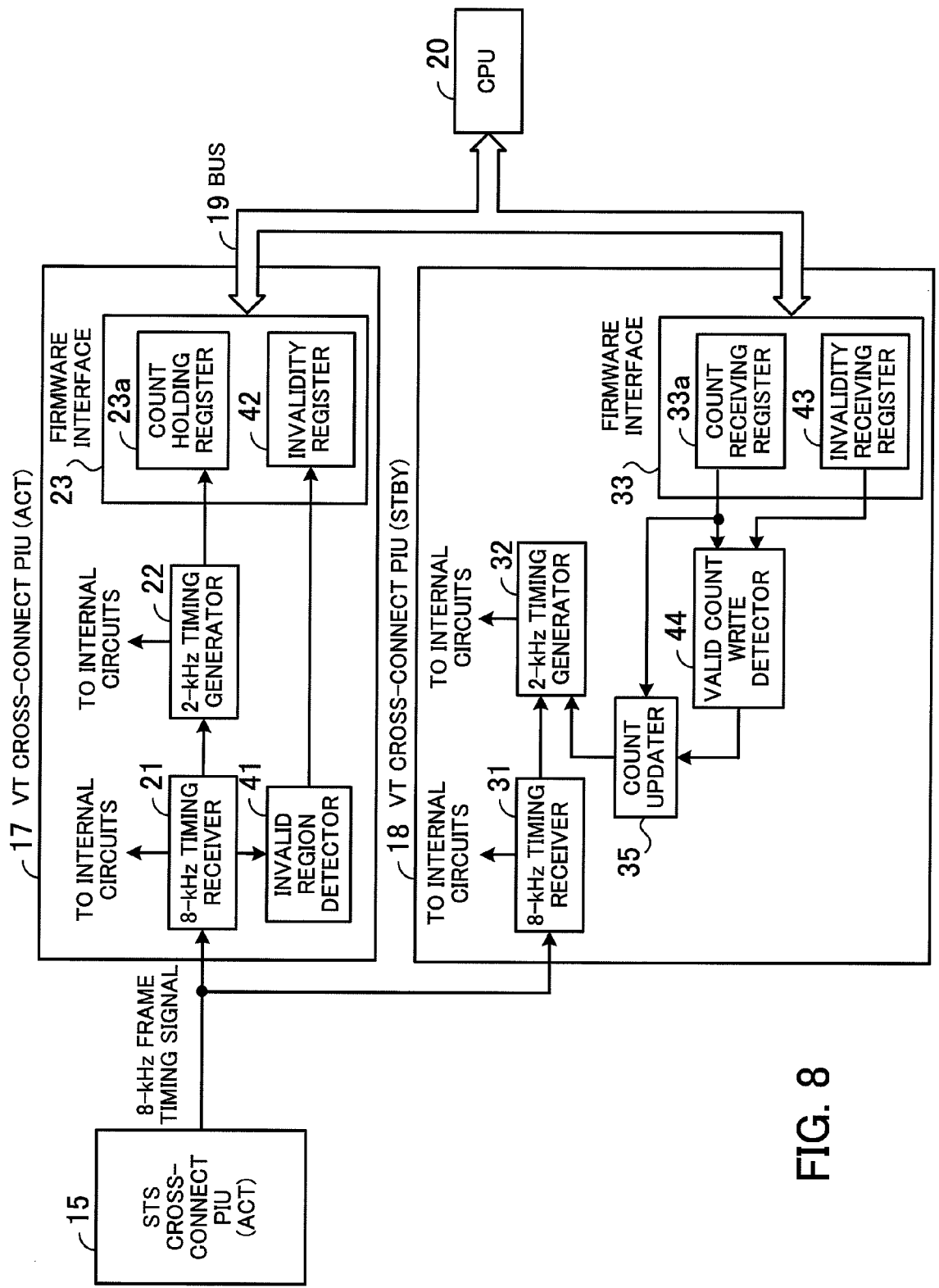
FIG. 8 is a block diagram showing details of VT cross-connect PIUs in a transmission device according to a second embodiment.

FIG. 8 is a block diagram showing details of VT cross-connect PIUs in a transmission device according to the second embodiment. In FIG. 8, like reference numerals are used to denote like elements appearing in FIG. 5, and detailed description of such elements is omitted.

Compared with the configuration shown in FIG. 5, the VT cross-connect PIU 17 additionally includes an invalid region detector 41, and the firmware interface 23 of the PIU 17 additionally includes an invalidity register 42. Also, the VT cross-connect PIU 18 includes a valid count write detector 44, and the firmware interface 33 of the PIU 18 includes an invalidity receiving register 43.

The invalid region detector 41 detects an invalid region in which copying of the count value of the divide-by-four frequency divider/counter should be suspended so as to avoid possible overlapping with the count-up of the count value of the divide-by-four frequency divider/counter.

Let it be assumed that a time period of 25 μs, for example, is required to copy the count value. The period of the 8-kHz frame timing signal is 125 μs, and if the copying of the count value is started within the last 25-μs interval of the 125-μs period, the copying operation overlaps with the count-up of the count value of the divide-by-four frequency divider/counter. In this instance, the last 25-μs interval of the 125-μs period is set as the invalid region, and the invalid region detector 41 detects the last 25-μs interval as the invalid region.

Figure 9:
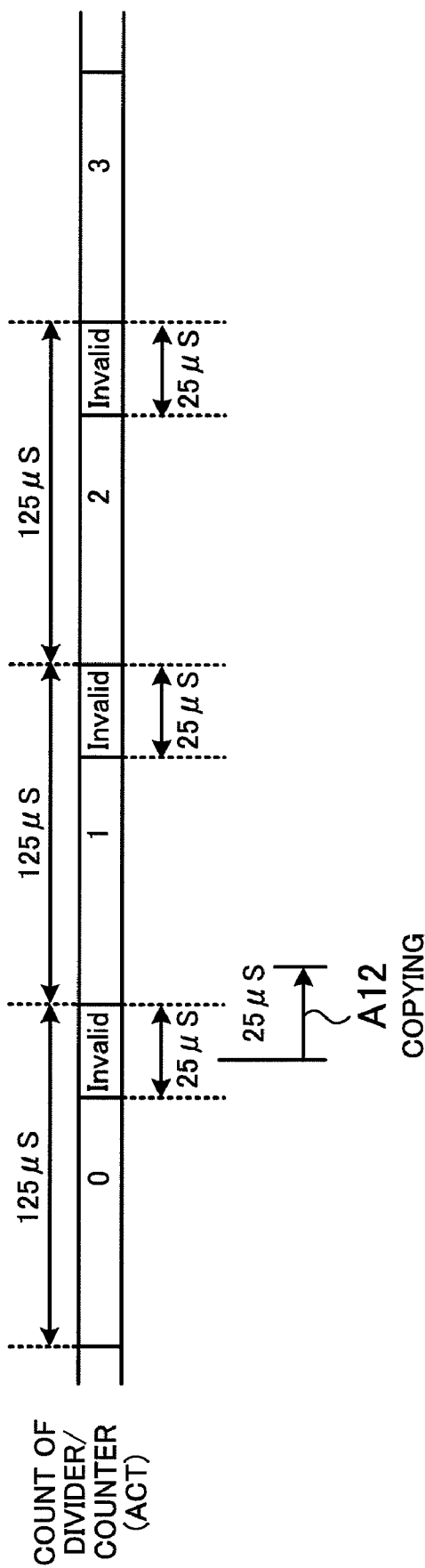
FIG. 9 illustrates invalid regions.

FIG. 9 illustrates the invalid region, wherein the count value of the divide-by-four frequency divider/counter of the 2-kHz timing generator 22 is shown. As illustrated, the last 25-μs interval of the 125-μs period (frequency: 8 kHz) is set as the invalid region.

If the copying of the count value is started within the invalid region as indicated by arrow A12, the copying operation overlaps with the count-up of the count value of the divide-by-four frequency divider/counter. In the illustrated example, the copying operation overlaps with a transition of the count value from "0" to "1".

Referring again to FIG. 8, on detecting the invalid region, the invalid region detector 41 writes information indicative of entry into the invalid region, in the invalidity register 42. For example, the invalid region detector writes "1" in the invalidity register 42 if the current time is within the invalid region, and writes "0" in the invalidity register 42 if the current time is outside the invalid region. In the example shown in FIG. 9, "1" is written in the invalidity register 42 only during the invalid intervals, and "0" is written during the other intervals.

The CPU 20 periodically acquires, via the bus 19, the contents of the count holding register 23*a* and invalidity register 42. Then, the CPU writes, via the bus 19, the acquired contents of the count holding register 23*a* and invalidity register 42 in the count receiving register 33*a* and invalidity receiving register 43, respectively, of the firmware interface 33.

By looking up the invalidity receiving register 43, therefore, the standby VT cross-connect PIU 18 can determine whether the active VT cross-connect PIU 17 is currently in the invalid region or not.

The valid count write detector 44 determines whether or not the count receiving register 33*a* has received the count value of the divide-by-four frequency divider/counter of the active PIU. Also, the valid count write detector 44 looks up the invalidity receiving register 43 to determine whether or not the active VT cross-connect PIU is currently in the invalid region.

Thus, the valid count write detector 44 receives the active-PIU count value from the count receiving register 33*a* and also looks up the invalidity receiving register 43 and, if the active VT cross-connect PIU 17 is currently not in the invalid region, notifies the count updater 35 that the count value to be updated to is valid.

Accordingly, if the active VT cross-connect PIU 17 is in the invalid region when the active-PIU count value is received from the count receiving register 33*a*, the valid count write detector 44 does not notify the count updater 35 that the count value is valid. This prevents the copying of the count value from overlapping with the count-up of the count value of the divide-by-four frequency divider/counter, thereby preventing the frequency divider/counters of the active and standby PIUs from becoming desynchronized from each other.

When notified from the valid count write detector 44 that the count value received from the active PIU is valid, the count updater 35 writes the active-PIU count value received from the count receiving register 33*a* over the count value of the divide-by-four frequency divider/counter in the 2-kHz timing generator 32. Consequently, the multi-frame signals of the active and standby PIUs are synchronized with each other.

The transmission device is configured such that the count holding register 23*a* and the invalidity register 42 are assigned the same address. This permits the CPU 20 to read out, at a time, the contents of the count holding register 23*a* and invalidity register 42. Similarly, the count receiving register 33*a* and the invalidity receiving register 43 are assigned the same address. This enables the CPU 20 to write information about the active PIU at a time in the count receiving register 33*a* and the invalidity receiving register 43.

The manner of how the count values of the divide-by-four frequency divider/counters are synchronized will be now described.

Figure 10:
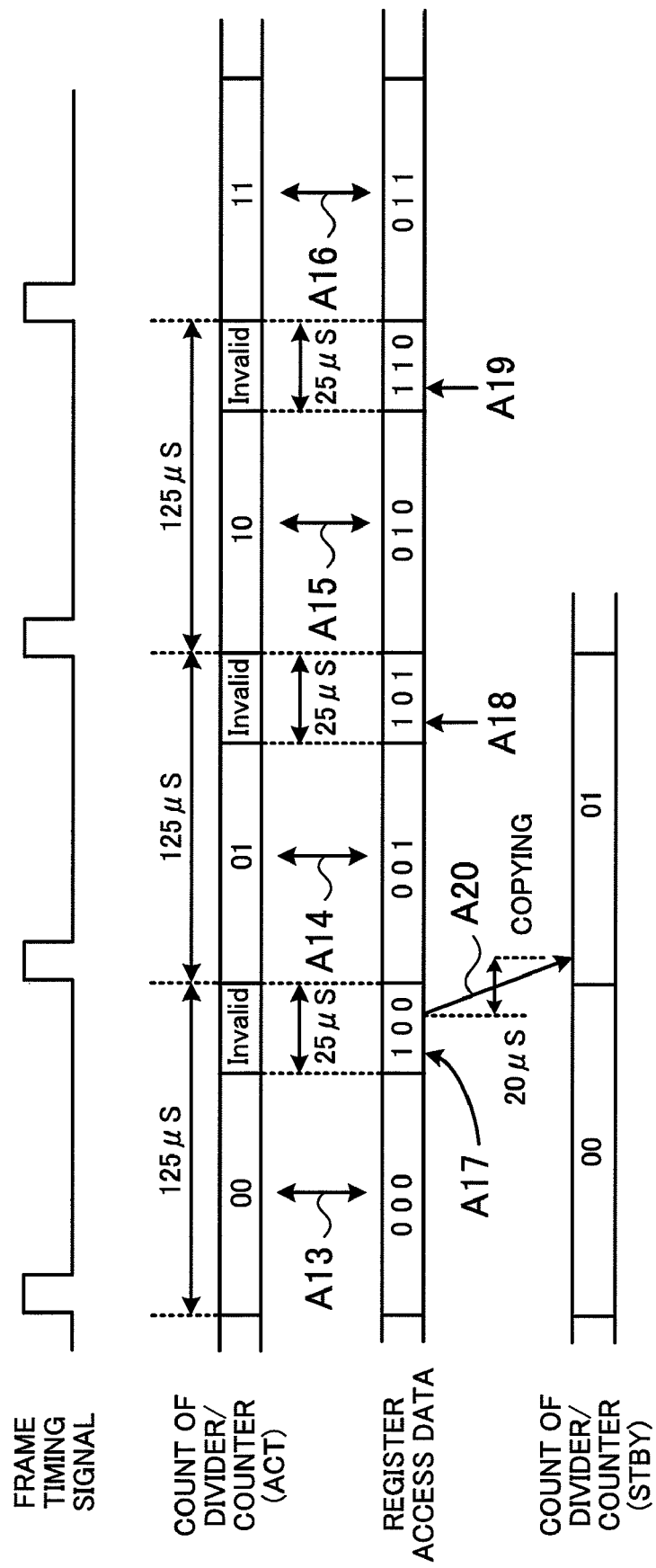
FIG. 10 shows the count values of divide-by-four frequency divider/counters.

FIG. 10 shows the count values of the divide-by-four frequency divider/counters. Specifically, the figure shows the 8-kHz frame timing signal, the count value of the divide-by-four frequency divider/counter in the 2-kHz timing generator 22 of the active PIU, data (in the figure, register access data) that the count holding register 23*a* and the invalidity register 42 hold when accessed by the CPU 20, and the count value of the divide-by-four frequency divider/counter in the 2-kHz timing generator 32 of the standby PIU. The count values of the divide-by-four frequency divider/counters and the register values are expressed in binary notation.

It is assumed here that the time required for the CPU 20 to copy a count value is 20 µs. Provided a maximum skew of the frame timing signal caused between the VT cross-connect PIUs 17 and 18 is 2 µs, the invalid region is set to 25 µs by adding the maximum skew and a margin of 3 µs to the copying time. The invalid region detector 41 starts its counter synchronously with the rise of a pulse of the 8-kHz frame timing signal, for example, and determines whether or not a time period of 100 µs (=125 µs (period of 8-kHz frame timing signal)−25 µs (length of invalid region)) has passed from the starting point. If more than 100 µs have elapsed from the pulse rise of the frame timing signal, the invalid region detector 41 judges that the current time is within the invalid region.

As shown in FIG. 10, the divide-by-four frequency divider/counter of the active PIU recurrently counts up as 00, 01, 10, 11, 00, 01, . . . in synchronism with the 8-kHz frame timing signal. Similarly, the divide-by-four frequency divider/counter of the standby PIU also recurrently counts up as 00, 01, 10, 11, 00, 01 . . . .

In the 3-bit register access data shown in FIG. 10, the first and second bits from the right indicate the register value of the count holding register 23a and the third bit indicates the register value of the invalidity register 42.

Accordingly, the first and second bits of the register access data coincide with the count value of the divide-by-four frequency divider/counter of the active PIU, as indicated by arrows A13 to A16. In regions other than the invalid region, the third bit of the register access data carries "0", as indicated by arrows A13 to A16, and in the invalid region, the third bit carries "1", as indicated by arrows A17 to A19.

Suppose that the CPU 20 copies a count value while the active PIU is in the invalid region, as indicated by arrow A20. In this case, the third bit of the register access data is "1" as indicated by arrow A17, and therefore, the count value is not overwritten. As a result, the count value of the divide-by-four frequency divider/counter of the standby PIU is not updated, as indicated by arrow A20.

In this manner, copying of the count value is suspended if the copying operation overlaps with a transition of the count value of the divide-by-four frequency divider/counter, thereby preventing the divide-by-four frequency divider/counters of the active and standby PIUs from becoming desynchronized from each other.

A third embodiment of the present invention will be now described in detail with reference to the drawings. In cases where the PIUs have just been powered on or a PIU for generating a system clock signal, such as the frame timing signal, is not installed, it is likely that the 8-kHz frame timing signal is not synchronized between the active and standby VT cross-connect PIUs. In such cases, each time the CPU copies the count value of the active PIU to the standby PIU, the count value of the standby PIU changes, bringing about a situation where the 2-kHz multi-frame signal varies in response to each copying operation. If the multi-frame signal varies, the internal circuits of the PIU need to be again synchronized for frame synchronization. It is therefore desirable that needless variation of the multi-frame signal should be avoided. Accordingly, in the third embodiment, the count value of the standby PIU is updated after synchroneity of the 8-kHz frame timing signals is detected.

Figure 11:
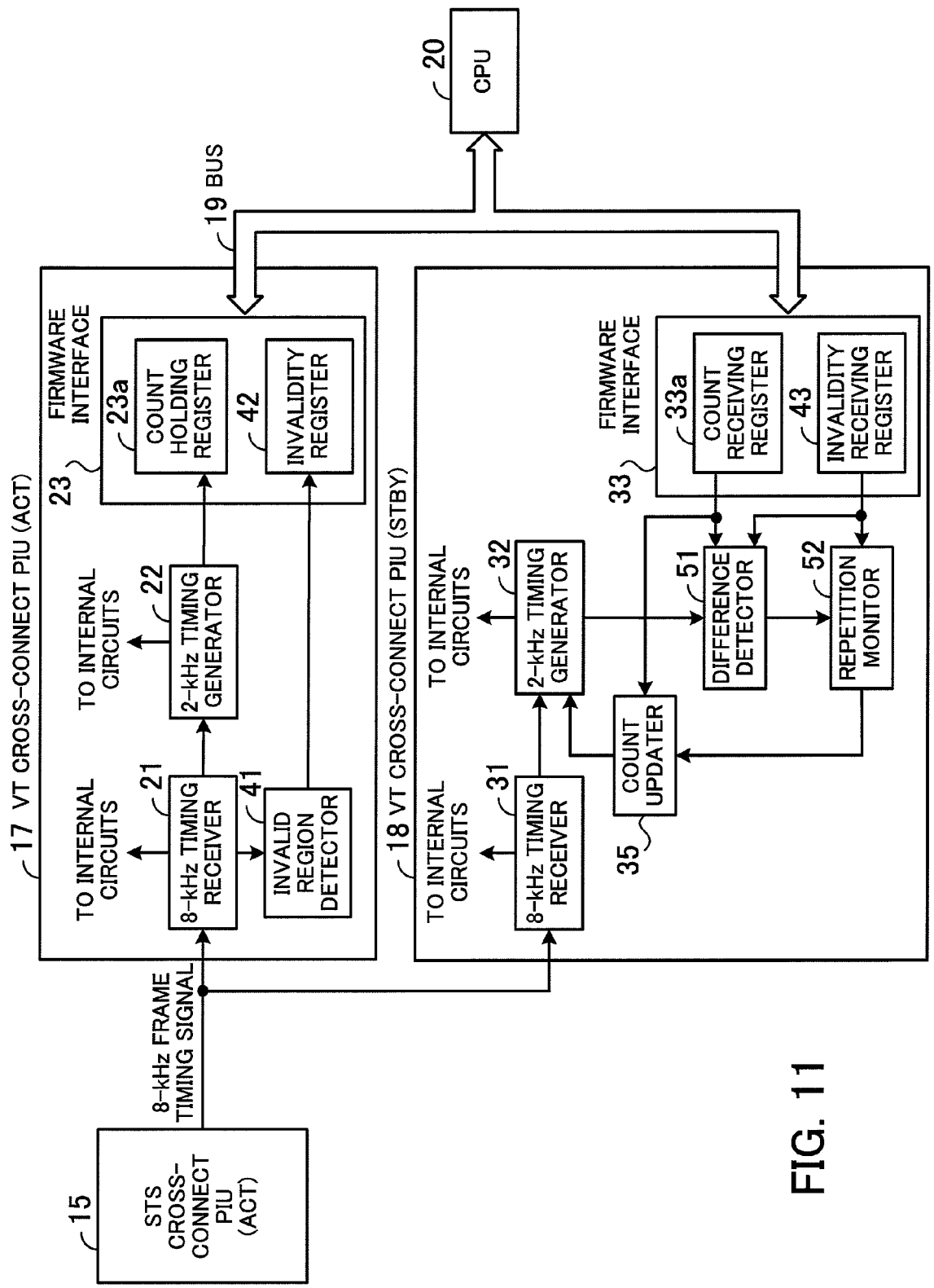
FIG. 11 is a block diagram showing details of VT cross-connect PIUs in a transmission device according to a third embodiment.

FIG. 11 is a block diagram showing details of VT cross-connect PIUs in a transmission device according to the third embodiment. In FIG. 11, like reference numerals are used to denote like elements appearing in FIG. 8, and detailed description of such elements is omitted.

As illustrated, the VT cross-connect PIU 18 includes a difference detector 51 and a repetition monitor 52, as distinct from the counterpart shown in FIG. 8.

The difference detector 51 detects reception of the count value by the count receiving register 33a. Then, the difference detector calculates a difference between the count value of the active PIU, received by the count receiving register 33a, and the count value of the divide-by-four frequency divider/counter of the 2-kHz timing generator 32, on condition that the value of the invalidity receiving register 43 shows a region other than the invalid region. Namely, if the active VT cross-connect PIU 17 is in the invalid region, the difference detector 51 does not calculate a difference between the count values.

If one count value is simply subtracted from the other to obtain the difference between the two, the subtraction may provide an insignificant value. For example, the result of subtraction can be a negative value. In such cases, "4" is added to the result of subtraction, for example, to thereby obtain a significant difference between the count values.

The repetition monitor 52 outputs a count update request to the count updater 35 if the difference detector 51 outputs the same difference value three times consecutively, for example. The count update request is output, however, on condition that the value of the invalidity receiving register 43 shows a region other than the invalid region. Namely, if the active VT cross-connect PIU 17 is in the invalid region, the repetition monitor 52 does not output a count update request to the count updater 35.

The divide-by-four frequency divider/counters of the active and standby PIUs both recurrently count up as 0, 1, 2, 3, 0, 1, . . . at 8 kHz. Thus, if the difference between the count values of the divide-by-four frequency divider/counters of the active and standby PIUs remains the same a predetermined number of times, then it can be concluded that the 8-kHz frame timing signals have been synchronized.

On receiving the count update request from the repetition monitor 52, the count updater 35 updates the count value of the 2-kHz timing generator 32 to the count value received from the count receiving register 33a.

In this manner, after synchroneity of the 8-kHz frame timing signals is achieved, the 2-kHz multi-frame signals are synchronized with each other.

The operation of the transmission device shown in FIG. 11 will be now explained with reference to specific values held by various elements of the device.

Figure 12:
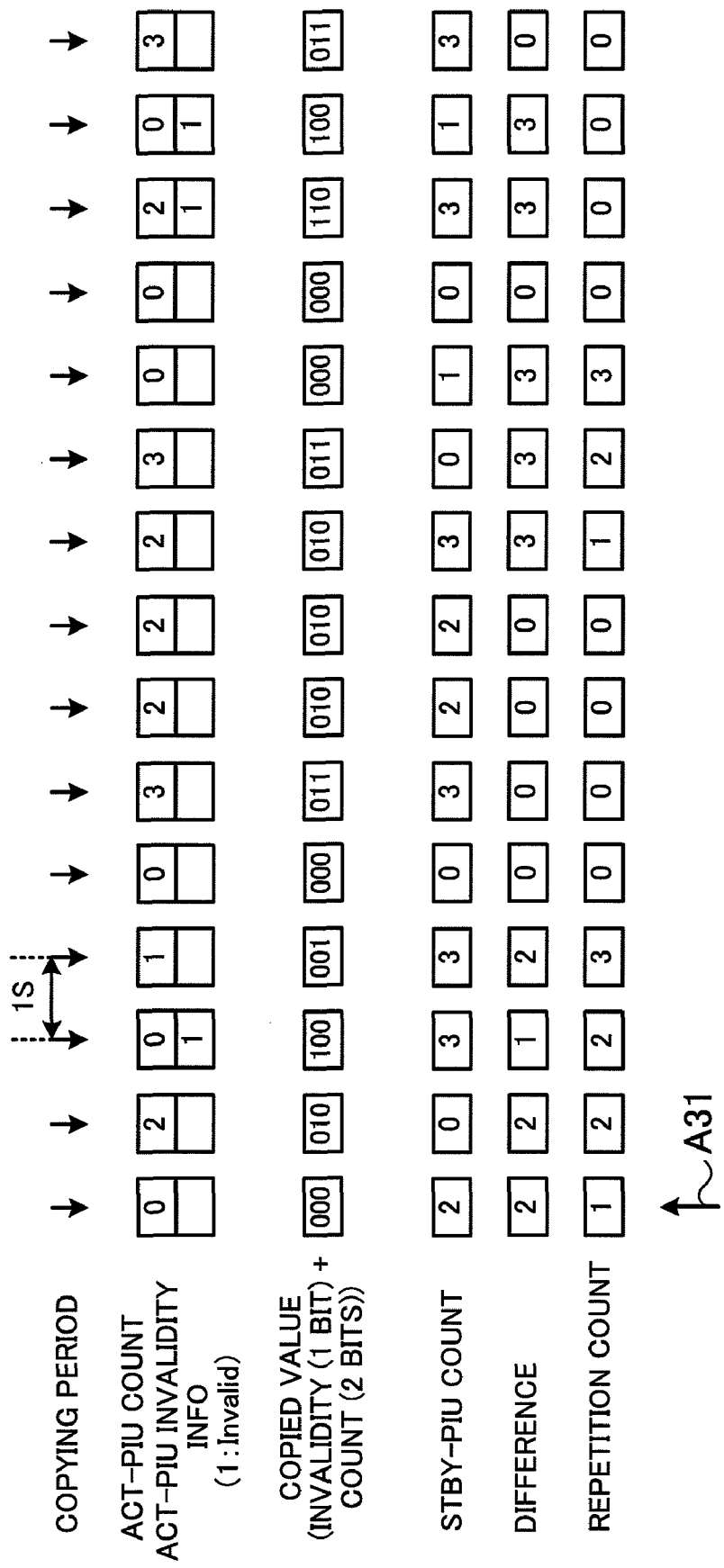
FIG. 12 shows values at various parts appearing in FIG. 11.

FIG. 12 shows such values held by elements appearing in FIG. 11. In the figure, "COPYING PERIOD" represents intervals at which the CPU 20 copies the count value and invalidity information of the active PIU to the standby PIU. The copying period is, for example, 1 s (sec) as illustrated.

"ACT-PIU COUNT" indicates the register value of the count holding register 23a of the active PIU in each second (copying period), that is, the count value of the divide-by-four frequency divider/counter of the 2-kHz timing generator 22 in each second.

"ACT-PIU INVALIDITY INFO" indicates the register value of the invalidity register 42 in each second. The numeral "1" shows that the VT cross-connect PIU 17 is in the invalid region.

"COPIED VALUE" represents the register values of the count receiving register 33a and invalidity receiving register 43 of the standby PIU in each second. The register values shown in FIG. 12 are expressed in binary notation, wherein the first and second bits from the right indicate the register value of the count receiving register 33a and the third bit indicates the register value of the invalidity receiving register 43. Accordingly, when the "ACT-PIU INVALIDITY INFO" is "1", the third bit of the "COPIED VALUE" shows "1".

"STBY-PIU COUNT" indicates the count value of the divide-by-four frequency divider/counter in the 2-kHz timing generator 32 of the standby PIU in each second.

"DIFFERENCE" shows the result of subtraction obtained by the difference detector 51 in each second.

"REPETITION COUNT" indicates the number of times the same difference value is repeated.

In the copying period indicated by arrow A31 in FIG. 12, the count value of the active PIU is "0", the value copied from the active PIU is "000", and the count value of the standby PIU is "2". Accordingly, the difference value is "2". Assuming that the difference value "2" is derived for the first time, the repetition count is "1".

In the subsequent copying period, the count value of the active PIU is "2", the value copied from the active PIU is "010", and the count value of the standby PIU is "2". The difference value is, therefore, "2". Since the difference value "2" is repeated twice, the repetition count is "2".

In the next copying period, the count value of the active PIU is "0", the value copied from the active PIU is "100", and the count value of the standby PIU is "3". Accordingly, the difference value is "1". Since the invalidity information shows "1", however, the difference value "1" is regarded as invalid, and the repetition count remains at "2".

In the subsequent copying period, the count value of the active PIU is "1", the value copied from the active PIU is "001", and the count value of the standby PIU is "3". The difference value is therefore "2". Since the difference value "2" is repeated three times, the repetition count is "3".

As explained above with reference to FIG. 11, the repetition monitor 52 outputs a count update request to the count updater 35 when the difference detector 51 shows an identical difference value a predetermined number of times. For example, the count update request is output when the same difference value is repeated three times.

In the example shown in FIG. 12, the difference value "2" is repeated three times, and accordingly, the repetition monitor 52 outputs a count update request to the count updater 35. Consequently, the count value of the divide-by-four frequency divider/counter of the 2-kHz timing generator 32 is made to coincide with that of the divide-by-four frequency divider/counter of the 2-kHz timing generator 22.

In the next copying period, the difference value is "0", because the count values of the divide-by-four frequency divider/counters of the 2-kHz timing generators 32 and 22 coincide with each other.

The process explained above is repeatedly executed thereafter, and if the difference value changes, update of the count value is suspended until the same difference value is repeated three times.

In this manner, when the difference between the count values of the active and standby PIUs remains the same a predetermined number of times, the count value of the divide-by-four frequency divider/counter of the standby PIU is updated to the count value of the divide-by-four frequency divider/counter of the active PIU. This prevents the multi-frame signal from being updated needlessly because of asynchronism of the 8-kHz frame timing signals.

The probability that the same difference value is repeated three times will be now explained with reference to FIG. 13. In the figure, "N" indicates the number times copying is executed, and "PROBABILITY" indicates the probability that an identical difference value, except those regarded as invalid, is calculated three times or more when the copying is performed N times with the frame timing signals of the active and standby PIUs synchronized with each other. The copying period is 1 s (sec).

FIG. 13 shows that when copying is executed 10 times (N=10), for example, the probability that an identical difference value is calculated three times or more is 99.99%. Namely, the divide-by-four frequency divider/counters of the active and standby PIUs synchronize with each other in 10 seconds with a probability of 99.99%.

The probability may be calculated based on the probability that an invalid difference value is received while copying is executed N times, for example, by calculating (probability of zero occurrence of invalid difference value in N)+(probability of once occurrence of invalid difference value in N)+ . . . +(probability of (N−3) occurrences of invalid difference value in N).

Referring now to FIG. 14, the probability that the count value of the standby PIU is updated when the number of repetitions is set to M with the frame timing signals desynchronized will be explained. In the figure, "M" denotes the number of repetitions of an identical difference value required to update the count value. "PROBABILITY" shows the probability that the count value of the divide-by-four frequency divider/counter of the standby PIU is updated while the 8-kHz frame timing signals of the active and standby PIUs are desynchronized from each other.

FIG. 14 reveals that when the number of repetitions is set to "3" (M=3), for example, the count value of the standby PIU is updated with a probability of about 0.9%. While the 8-kHz frame timing signals of the active and standby PIUs are asynchronous, updating of the count value should desirably be avoided. However, a probability of about 0.9% is significantly low and satisfactorily serves to prevent needless updating.

The probability may be calculated based on the probability that the copied value disagrees with the count value and at the same time the difference value remains the same M times consecutively while the frame timing signals are desynchronized, for example, by calculating (first copying: probability of disagreement=3/5)×(second copying: (probability of disagreement=3/5)×(probability of agreement with first difference=1/4))× . . . ×(Mth copying: (probability of disagreement=3/5)×(probability of agreement with first difference=1/4)).

In this manner, the 2-kHz multi-frame signals are synchronized after synchroneity of the 8-kHz frame timing signals is achieved. It is therefore possible to prevent the multi-frame signal from being updated needlessly because of asynchronism of the frame timing signals.

The third embodiment described above, in which the count value of the standby PIU is updated depending on the number of times the same difference value is repeated, can be applied to the first embodiment. Specifically, in the first embodiment in which the invalid region is not detected, a difference value between the count values of the active and standby PIUs may be derived so that the count value of the standby PIU may be updated when the difference value remains the same a predetermined number of times.

A fourth embodiment of the present invention will be now described in detail with reference to the drawings. In the third embodiment, the difference detector and the repetition monitor are provided in the PIUs, but the CPU may be configured to perform these functions. In the fourth embodiment, the CPU functions as the difference detector as well as the repetition monitor.

Figure 15:
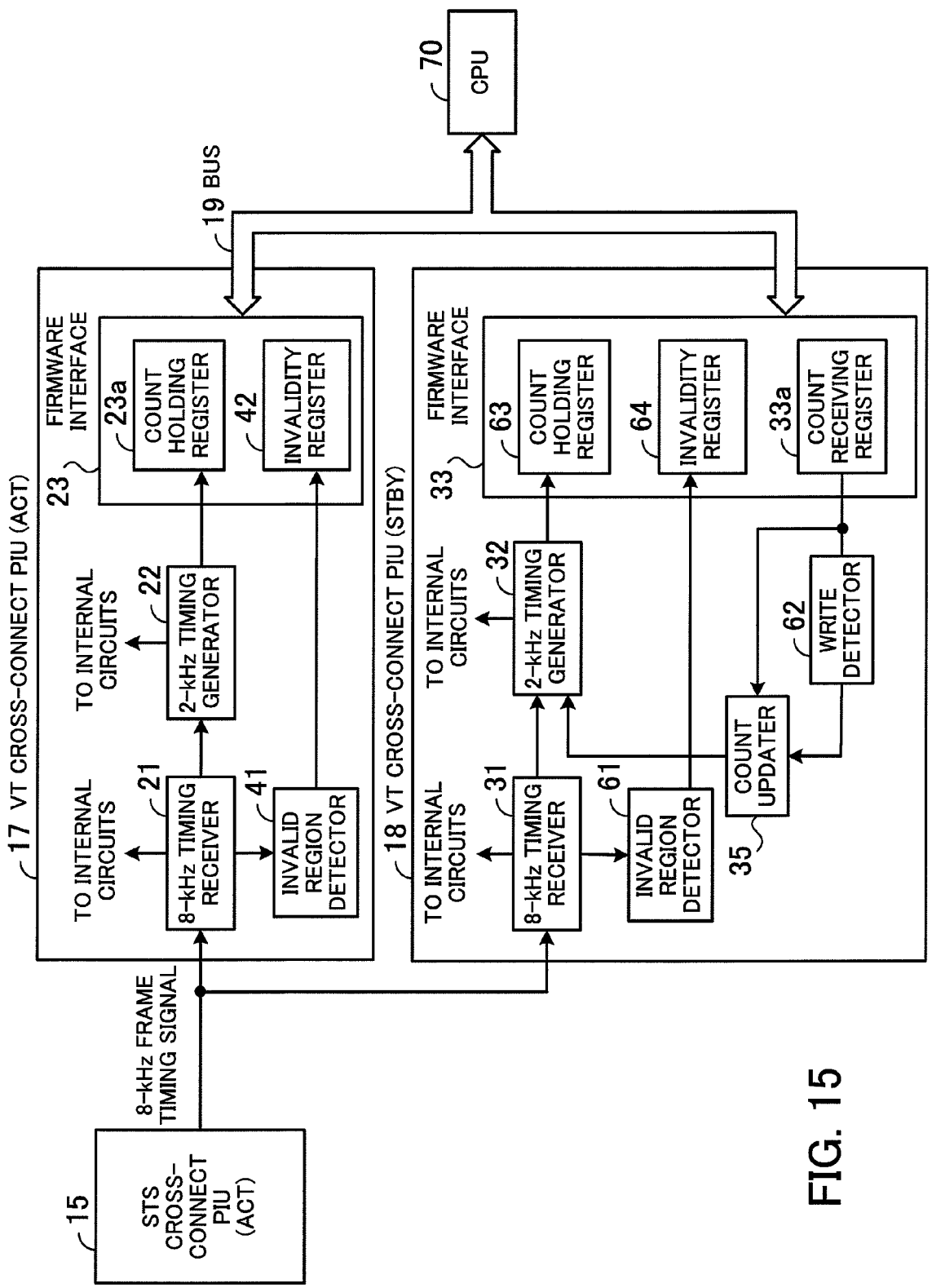
FIG. 15 is a block diagram showing details of VT cross-connect PIUs in a transmission device according to a fourth embodiment.

FIG. 15 is a block diagram showing details of VT cross-connect PIUs in a transmission device according to the fourth embodiment. In FIG. 15, like reference numerals are used to denote like elements appearing in FIG. 11, and detailed description of such elements is omitted.

As illustrated, the VT cross-connect PIU 18 includes an invalid region detector 61 and a write detector 62, as distinct from the counterpart shown in FIG. 11. Also, the firmware interface 33 includes a count holding register 63 and an invalidity register 64.

The invalid region detector 61 has the same function as the invalid region detector 41 of the active VT cross-connect PIU 17. Namely, the invalid region detector 61 detects the invalid region and writes information indicative of entry into the invalid region (e.g., "1"), in the invalidity register 64.

The write detector 62 detects reception of the count value by the count receiving register 33a and notifies the count updater 35 that the count value has been received.

The count holding register 63 has the same function as the count holding register 23a of the active PIU. Namely, the count holding register 63 holds the count value of the divide-by-four frequency divider/counter provided in the 2-kHz timing generator 32.

The invalidity register 64 functions in the same manner as the invalidity register 42 of the active PIU. Namely, when the VT cross-connect PIU 18 is in the invalid region, information indicative of invalidity is written in the invalidity register 64 by the invalid region detector 61.

Compared with the configuration shown in FIG. 11, the VT cross-connect PIU 18 is equipped neither with the difference detector 51 nor with the repetition monitor 52. The functions of the difference detector 51 and repetition monitor 52 are performed by a CPU 70.

The CPU 70 receives, at regular intervals, the count value of the divide-by-four frequency divider/counter and the invalidity information from the active VT cross-connect PIU 17. Also, the CPU periodically receives the count value of the divide-by-four frequency divider/counter and the invalidity information from the standby VT cross-connect PIU 18. The CPU 70 calculates a difference value between the count values of the active and standby PIUs and, if an identical difference value is obtained consecutively a predetermined number of times, writes the count value acquired from the active PIU in the count receiving register 33a of the standby PIU.

Figure 16:
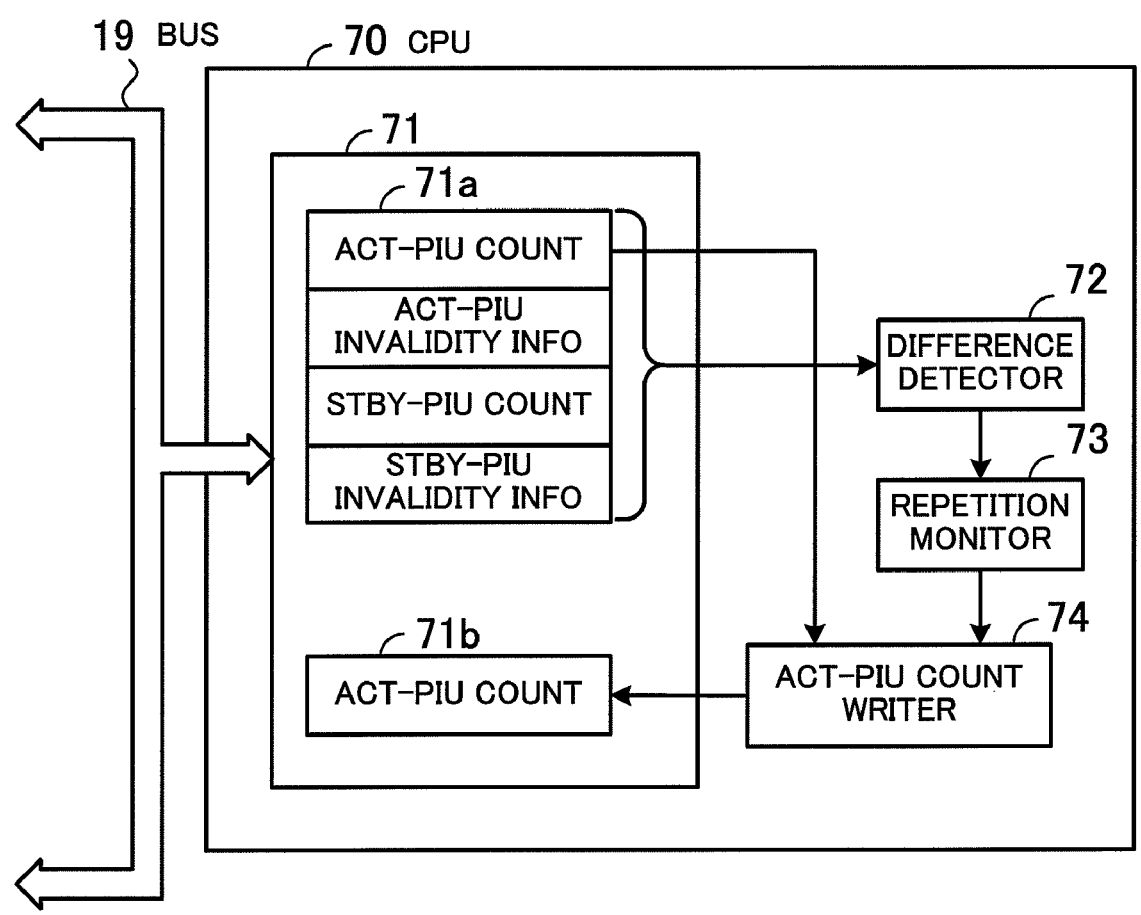
FIG. 16 is a functional block diagram of a CPU.
Figure 17:
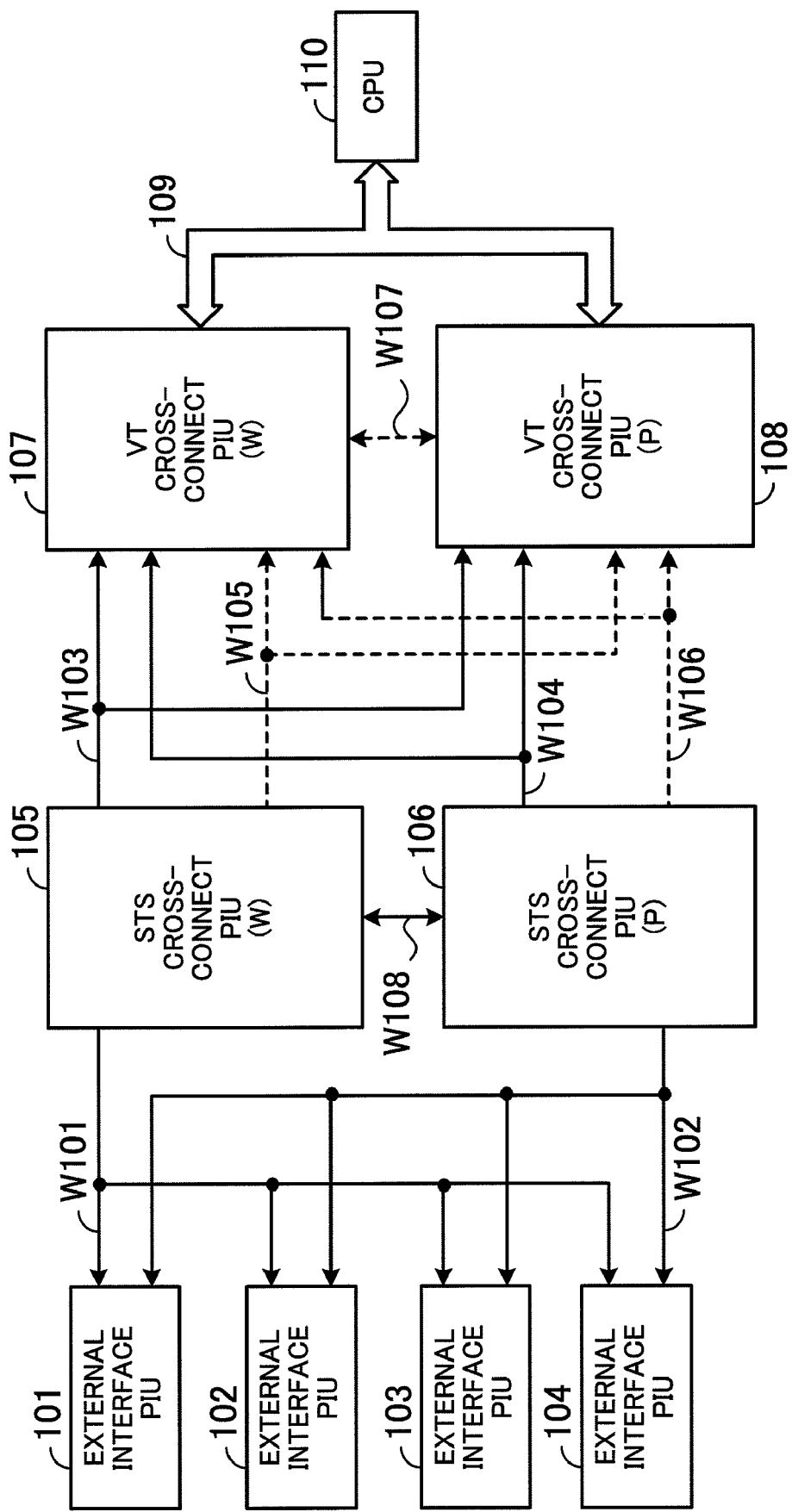
FIG. 17 shows wirings of a conventional transmission device for transferring a frame timing signal and a multi-frame signal.

FIG. 16 is a functional block diagram of the CPU. As illustrated, the CPU 70 includes a register 71, a difference detector 72, a repetition monitor 73, and an active-PIU count writer 74. The CPU 70 performs these functions by executing firmware.

The register 71 includes a register 71a for holding the count value of the divide-by-four frequency divider/counter of the active PIU, the invalidity information of the active PIU, the count value of the divide-by-four frequency divider/counter of the standby PIU, and the invalidity information of the standby PIU. The CPU 70 periodically accesses the active and standby VT cross-connect PIUs 17 and 18 to acquire these items of information, and stores the acquired information in the register 71a.

Also, the register 71 includes a register 71b for holding the count value of the active PIU which is to be written in the count receiving register 33a of the standby PIU.

The difference detector 72 calculates a difference between the count values of the active and standby PIUs, both held by the register 71a. The difference is calculated, however, on condition that the invalidity information of the active and standby PIUs shows a region other than the invalid region. Namely, when the VT cross-connect PIU 17 or 18 is in the invalid region, the difference detector 72 does not calculate the difference value.

If the difference value calculated by the difference detector 72 remains the same three times consecutively, for example, the repetition monitor 73 notifies the active-PIU count writer 74 of the repetition of the same difference value.

On receiving the notification from the repetition monitor 73, the active-PIU count writer 74 stores the count value of the active PIU, held by the register 71a, in the register 71b. The active-PIU count value stored in the register 71b is then written via the bus 19 in the count receiving register 33a of the standby PIU.

The count updater 35 updates the count value of the divide-by-four frequency divider/counter in the 2-kHz timing generator 32 to the active-PIU count value received by the count receiving register 33a. Consequently, the 2-kHz multi-frame signals of the active and standby VT cross-connect PIUs 17 and 18 are synchronized with each other.

In this manner, the CPU 70 receives the count values of the active and standby PIUs and calculates the difference between the two count values. Also in this case, the multi-frame signals of the active and standby PIUs can be synchronized with each other.

Further, since the difference detection function and the repetition monitoring function are performed by the CPU 70, hardware for implementing these functions is unnecessary, making it possible to reduce costs.

In the above first through fourth embodiments, the explanation is directed to methods for synchronizing 2-kHz multi-frames. However, the same configurations as described above can also be used with respect to the function of constructing multi-frames on the basis of 8-kHz frames, such as construction of 16 or 64 frames using the J1 path trace byte, for the purpose of frame synchronization.

In the transmission device of the present invention, the standby unit receives the count value of the frequency divider/counter of the active unit through the bus connected to the central processing unit. Then, the standby unit updates the count value of its frequency divider/counter to the received count value, thereby synchronizing its count value with that of the active unit. It is therefore unnecessary to provide exclusive wiring for synchronizing the timing signals, thereby restraining enlargement in scale of wiring.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission device provided in a synchronous communication network to transmit signals, comprising:
   a bus;
   a reference signal generator to generate a reference signal;
   an active unit coupled to the bus and the reference signal generator, comprising:
      a first reference signal receiver to receive the reference signal,
      a first timing signal generator comprising a first counter to divide a frequency of the received reference signal and thereby generate a first timing signal for operation of the active unit, and
      a first count holder to hold a first count value of the first counter for access via the bus; and
   a standby unit coupled to the bus and the reference signal generator, comprising:

a second reference signal receiver to receive the reference signal, a second timing signal generator comprising a second counter to divide a frequency of the received reference signal and thereby generate a second timing signal for operation of the standby unit, a count receiver to receive, via the bus, the first count value from the first count holder in the active unit, and a count updater to update a second count value of the second counter with the first count value received by the count receiver.

2. The transmission device according to claim 1, further comprising a central processing unit that acquires the first count value from the first count holder of the active unit via the bus, and writes the acquired count value in the count receiver of the standby unit.

3. The transmission device according to claim 1, further comprising:

a timing detector mounted on the active unit to detect timing overlapping with transition of the first count value of the first counter; and a timing receiver mounted on the standby unit to receive, from the active unit, information indicating the timing overlapping with transition of the first count value, wherein, at the timing overlapping with transition of the first count value, the count updater does not update the second count value of the second counter.

4. The transmission device according to claim 1, further comprising:

a difference calculator mounted on the standby unit to calculate a difference value between the first count value received by the count receiver and the second count value of the second counter; and a difference value counter mounted on the standby unit to count a number of repetitions of an identical difference value, wherein the count updater updates the second count value of the second counter in accordance with the number of repetitions.

5. The transmission device according to claim 1, further comprising a central processing unit coupled to the bus, wherein the standby unit further comprises a second count holder that holds the second count value of the second counter for access via the bus, and wherein the central processing unit further comprises:

a unit count receiver to receive the first and second count values from the first and second count holders of the active and standby units, respectively;

a difference calculator to calculate a difference value between the first and second count values received by the unit count receiver;

a difference value counter to count a number of occurrences of an identical difference value; and a count sender to send the first count value of the active unit to the standby unit in accordance with the number of occurrences.

6. The transmission device according to claim 1, wherein the reference signal is an 8-kHz frame timing signal, and the first and second timing signals are 2-kHz multi-frame signals.

7. The transmission device according to claim 1, wherein the active and standby units each comprise a VT cross-connect function.

* * * * *